United States Patent
Mueller et al.

(10) Patent No.: US 11,596,882 B2
(45) Date of Patent: Mar. 7, 2023

(54) WATER PITCHER WITH FLOAT AND UNDERSIDE FILTER

(71) Applicant: Plenty Company, LLC, Scottsdale, AZ (US)

(72) Inventors: Michael A. Mueller, Phoenix, AZ (US); Mark Yeary, Gilbert, AZ (US); George L. Hagen, Flagstaff, AZ (US); Marcus J. Shotey, Scottsdale, AZ (US); Kenneth C. Booth, Mesa, AZ (US)

(73) Assignee: Plenty Company, LLC, Scottsdale, AZ (US)

( * ) Notice: Subject to any disclaimer, the term of this patent is extended or adjusted under 35 U.S.C. 154(b) by 214 days.

(21) Appl. No.: 16/885,225

(22) Filed: May 27, 2020

(65) Prior Publication Data
US 2020/0376420 A1 Dec. 3, 2020

Related U.S. Application Data

(60) Provisional application No. 62/853,656, filed on May 28, 2019.

(51) Int. Cl.
*B01D 35/05* (2006.01)
*C02F 1/00* (2006.01)
(Continued)

(52) U.S. Cl.
CPC ......... *B01D 35/05* (2013.01); *B01D 33/0108* (2013.01); *B01D 35/30* (2013.01); *C02F 1/003* (2013.01); *C02F 2307/04* (2013.01)

(58) Field of Classification Search
CPC .... B01D 35/05; B01D 33/0108; B01D 35/30; C02F 1/003; C02F 2307/04; C02F 2201/004
See application file for complete search history.

(56) References Cited

U.S. PATENT DOCUMENTS

| 310,204 A | 1/1885 | Jenks |
| 3,319,577 A | 5/1967 | Francis |

(Continued)

FOREIGN PATENT DOCUMENTS

| CA | 2872680 | 12/2016 |
| CN | 104665434 | 6/2015 |

(Continued)

OTHER PUBLICATIONS

Advantec MFS 357000 Sanitary Stainless Steel In-Line Filter Holder, for 25 mm membranes, Cole-Parmer Instrument Company, LLC https://www.neobits.com/advantec_mfs_357000_advantec_357000_sanitary_p7056094.html?atc=gbs.

*Primary Examiner* — Bradley R Spies
*Assistant Examiner* — Jeannie McDermott
(74) *Attorney, Agent, or Firm* — Kenneth C. Booth; Booth Udall Fuller, PLC

(57) ABSTRACT

A water filter system with a filter housing, a filter media, a filter coupling, and a dynamic seal. The filter housing has a top plate and a bottom plate which are both water-permeable, as well as a cavity between the top plate and the bottom plate. The filter media is within the cavity of the filter housing and extends through the bottom plate of the filter housing. The filter coupling extends upward from the top plate and is configured to attach to a float with at least one air chamber. The dynamic seal is coupled to the filter housing along a perimeter of the filter housing and is configured to extend beyond a perimeter of the float, maintain contact with a wall of a water container, and restrict water from passing between the dynamic seal and the wall of the water container.

20 Claims, 23 Drawing Sheets

(51) Int. Cl.
  *B01D 35/30* (2006.01)
  *B01D 33/01* (2006.01)

(56) References Cited

U.S. PATENT DOCUMENTS

| | | | |
|---|---|---|---|
| 4,151,092 A | 4/1979 | Grimm et al. | |
| 4,999,109 A | 3/1991 | Sabre | |
| 5,733,448 A | 3/1998 | Kaura | |
| 5,830,360 A | 11/1998 | Mozayeni | |
| 5,919,365 A | 7/1999 | Collette | |
| 6,074,550 A | 6/2000 | Hofmann et al. | |
| 6,387,260 B1 | 5/2002 | Pimenov | |
| 6,524,477 B1 | 2/2003 | Hughes | |
| 6,602,406 B1 | 8/2003 | Nohren | |
| 6,835,311 B2 | 12/2004 | Koslow | |
| 7,323,104 B2 | 1/2008 | Wennerström | |
| 7,767,087 B2 | 8/2010 | Wilson | |
| 7,790,117 B2 | 9/2010 | Ellis et al. | |
| 7,807,052 B2 | 10/2010 | Milne | |
| 7,955,501 B2 | 6/2011 | Wilson | |
| 8,216,462 B2 | 7/2012 | o'Brien et al. | |
| 8,313,644 B2 | 11/2012 | Harris et al. | |
| 11,027,228 B1* | 6/2021 | Zou | C02F 1/003 |
| 2003/0196941 A1* | 10/2003 | Danner | A01K 63/045 |
| | | | 210/170.02 |
| 2004/0060873 A1* | 4/2004 | Yanou | B01D 61/18 |
| | | | 210/660 |
| 2006/0151381 A1 | 7/2006 | Wennerstrom | |
| 2006/0163148 A1* | 7/2006 | Hengsperger | C02F 1/003 |
| | | | 210/473 |
| 2007/0284300 A1 | 12/2007 | Bidlingmeyer et al. | |
| 2008/0164223 A1* | 7/2008 | Wilson | C02F 1/003 |
| | | | 210/348 |
| 2010/0065488 A1 | 3/2010 | Milne | |
| 2010/0320135 A1 | 12/2010 | Sun | |
| 2011/0168644 A1 | 7/2011 | Harris et al. | |
| 2014/0008311 A1 | 1/2014 | Weston et al. | |
| 2014/0083924 A1* | 3/2014 | Bergendal | B01D 35/02 |
| | | | 210/451 |
| 2015/0246824 A1* | 9/2015 | Boudreau | C02F 1/003 |
| | | | 210/244 |
| 2017/0007949 A1* | 1/2017 | Mayo | C02F 1/003 |
| 2017/0065914 A1* | 3/2017 | Shotey | C02F 1/003 |
| 2018/0207560 A1 | 7/2018 | Shotey et al. | |

FOREIGN PATENT DOCUMENTS

| | | | |
|---|---|---|---|
| CN | 104860368 | 8/2015 | |
| DE | 1298882 | 7/1969 | |
| DE | 19603884 | 3/1997 | |
| DE | 19603884 C1 * | 3/1997 | C02F 1/003 |
| FR | 3018459 | 9/2015 | |
| GB | 2197647 | 5/1988 | |
| GB | 2329852 A | 4/1999 | |
| RU | 2125974 | 2/1999 | |
| RU | 154245 U1 | 8/2015 | |
| TW | 201827112 A | 8/2018 | |
| WO | 2000057985 | 10/2000 | |
| WO | 200509215 | 10/2005 | |

* cited by examiner

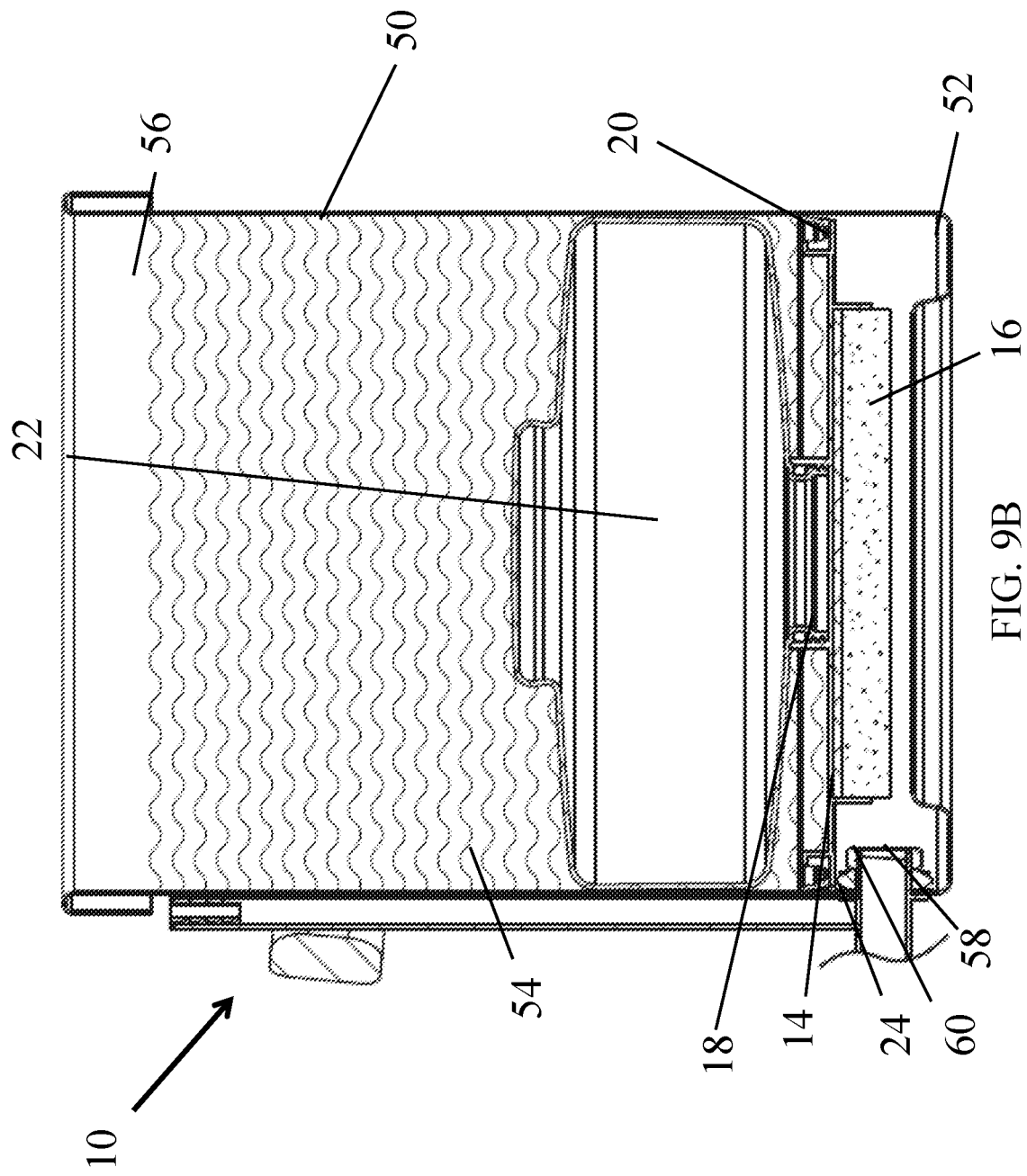

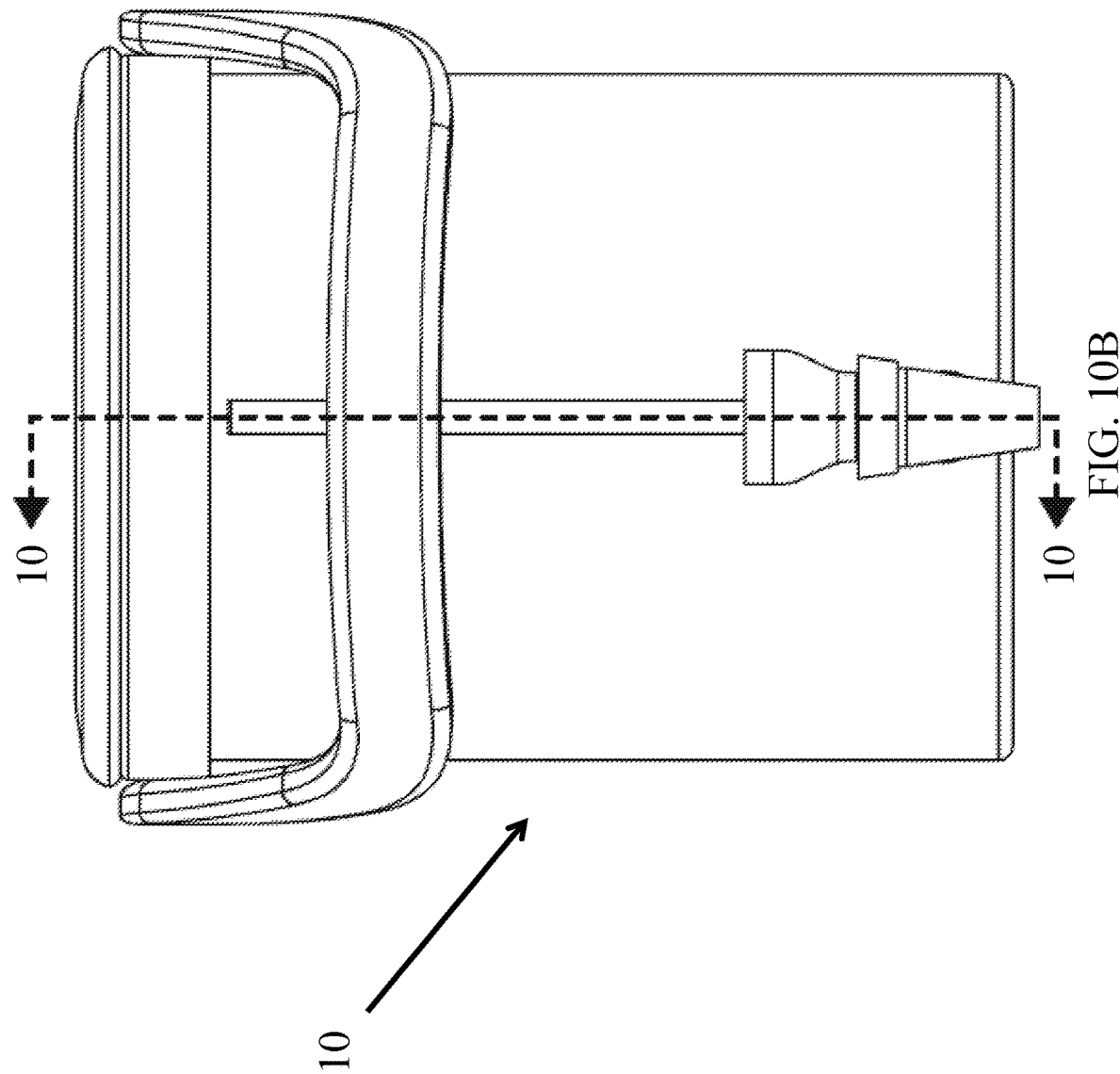

WATER PITCHER WITH FLOAT AND UNDERSIDE FILTER

RELATED APPLICATIONS

This application claims the benefit of the filing date of U.S. Provisional Patent Application 62/853,656 entitled "WATER PITCHER WITH FLOAT AND UNDERSIDE FILTER" to Shotey et al., which was filed May 28, 2019, the contents of which are hereby incorporated by this reference.

TECHNICAL FIELD

Aspects of the present disclosure relate generally to water filter systems.

BACKGROUND

Water pitchers that filter water are well known. They conventionally include a to-be-filtered water reservoir and a filtered water reservoir separated by a pathway through a water filter. Conventional water filters of this type are generally cylindrical in shape, or taller than they are wide, and are filled with granular activated carbon ("GAC"), some combination of fibrous filtering layers and GAC, and/or more recently may include block carbon filters.

Such filters pass water by gravity from above the filter, through openings in the top of the filter, through the filter media within the filter canister, down to holes in the bottom of the filter. Because conventional filters are stationary within the water pitcher, the to-be-filtered water reservoir and the filtered water reservoir both have static boundaries. This reduces the holding capacity of the water pitcher to hold filtered water. What is needed is a water filter system which allows the water filter to move to improve the filter water holding capacity of the water pitcher.

SUMMARY

According to an aspect of the disclosure, a water filter system may comprise a filter housing having a top plate and a bottom plate, wherein the top plate and the bottom plate each are water-permeable, a cavity defined by the top plate and the bottom plate, and a housing width and a housing height, wherein the housing width is at least two times the housing height, a filter media within the cavity of the filter housing and extending through the bottom plate of the filter housing, a filter coupling extending upward from the top plate of the filter housing and configured to attach to a float, and a dynamic seal coupled to the filter housing along a perimeter of the filter housing and configured to extend out beyond a perimeter of the float, maintain contact with a wall of a water container, and restrict water from passing between the dynamic seal and the wall of the water container when the water filter system is in a top position near a top of the water container, when the water filter system is in an intermediate position near a center of the water container, and when the water filter system is in a bottom position near a bottom of the water container.

Particular embodiments may comprise one or more of the following features. A float that has at least one air chamber within the float. The top plate and the bottom plate may each have at least one hole extending therethrough. The filter coupling may be threaded and attaches to the float by coupling with a threaded portion of the float. The filter coupling may have a lip configured to snap on to the float. The float may include an opening and the filter coupling covers the opening and restricts water access to the inside of the float when the filter housing is attached to the float.

According to another aspect of the disclosure, a water filter may comprise a filter housing having a top plate and a bottom plate, wherein the top plate and the bottom plate each are water-permeable, and a cavity defined by the top plate and the bottom plate, a filter media within the cavity of the filter housing and extending through the bottom plate of the filter housing, and a filter coupling extending upward from the top plate of the filter housing and configured to attach to a float.

Particular embodiments may comprise one or more of the following features. A dynamic seal may be coupled to the filter housing along a perimeter of the filter housing and configured to extend out beyond a perimeter of the float and restrict water from passing between the dynamic seal and a wall of a water container when the water filter is in a top position near a top of the water container, when the water filter is in an intermediate position near a center of the water container, and when the water filter is in a bottom position near a bottom of the water container. A float that has at least one air chamber within the float. A float that has an opening and the filter coupling covers the opening and restricts water access to the inside of the float when the filter housing is attached to the float. The filter coupling may be threaded and attaches to the float by coupling with a threaded portion of the float. The filter coupling may have a lip configured to snap on to the float.

According to another aspect of the disclosure, a water filter may comprise a filter housing having a top plate, wherein the top plate is water-permeable, a filter media below the top plate of the filter housing, and a filter coupling extending upward from the top plate of the filter housing and configured to attach to a float.

Particular embodiments may comprise one or more of the following features. The filter housing may further have a bottom plate and the water filter may further comprise a cavity defined by the top plate and the bottom plate, wherein the filter media extends through the bottom plate of the filter housing. A float having an opening and the filter coupling covers the opening and restricts water access to the inside of the float when the filter housing is attached to the float. A spacer adjacent a bottom of a water container configured to maintain a minimum distance between the bottom of the water container and the bottom plate of the filter housing. The water container may include a spout opening adjacent the bottom of the water container and the filter media extends below a top edge of the spout opening when the bottom plate of the filter housing is at the minimum distance from the bottom of the water container. A dynamic seal may be coupled to the filter housing along a perimeter of the filter housing and configured to extend out beyond a perimeter of the float and restrict water from passing between the dynamic seal and a wall of a water container when the water filter is in a top position near a top of the water container, when the water filter is in an intermediate position near a center of the water container, and when the water filter is in a bottom position near a bottom of the water container. A float having at least one air chamber within the float. The filter coupling may be threaded and attached to the float by coupling with a threaded portion of the float.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and:

FIG. 9B is a cross section view of the water container of FIG. 9A with the water filter system at the bottom of the water container and the water container filled with unfiltered water;

FIG. 10B is a side view of the water container from FIG. 10A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

In particular embodiments, such as those shown herein, different from a conventional cylindrical, taller-than-it-is-wide, cartridge, like that used in a Brita water pitcher, the configurations and designs shown in the associated figures use a wide, short filter housing profile, with a width at least twice its height, and in some embodiments having a width up to ten (10) times its height. Although the principles discussed herein in relation to water pathways through the filter housing and filter media are not limited to this configuration of filter housing for all applications of this technology, for exemplary purposes, this style of filter housing is used.

Additionally, Applicant previously submitted other patent applications relating to earlier designs for a water container with a floatable filter system and method which was granted U.S. Pat. No. 10,118,113, and a water container with floatable filter, which was granted U.S. Pat. No. 9,796,600, and water filter systems and methods of use, which was filed as application Ser. No. 14/302,205. The disclosures of each of these patents and application are hereby incorporated herein by reference.

Figure 1:
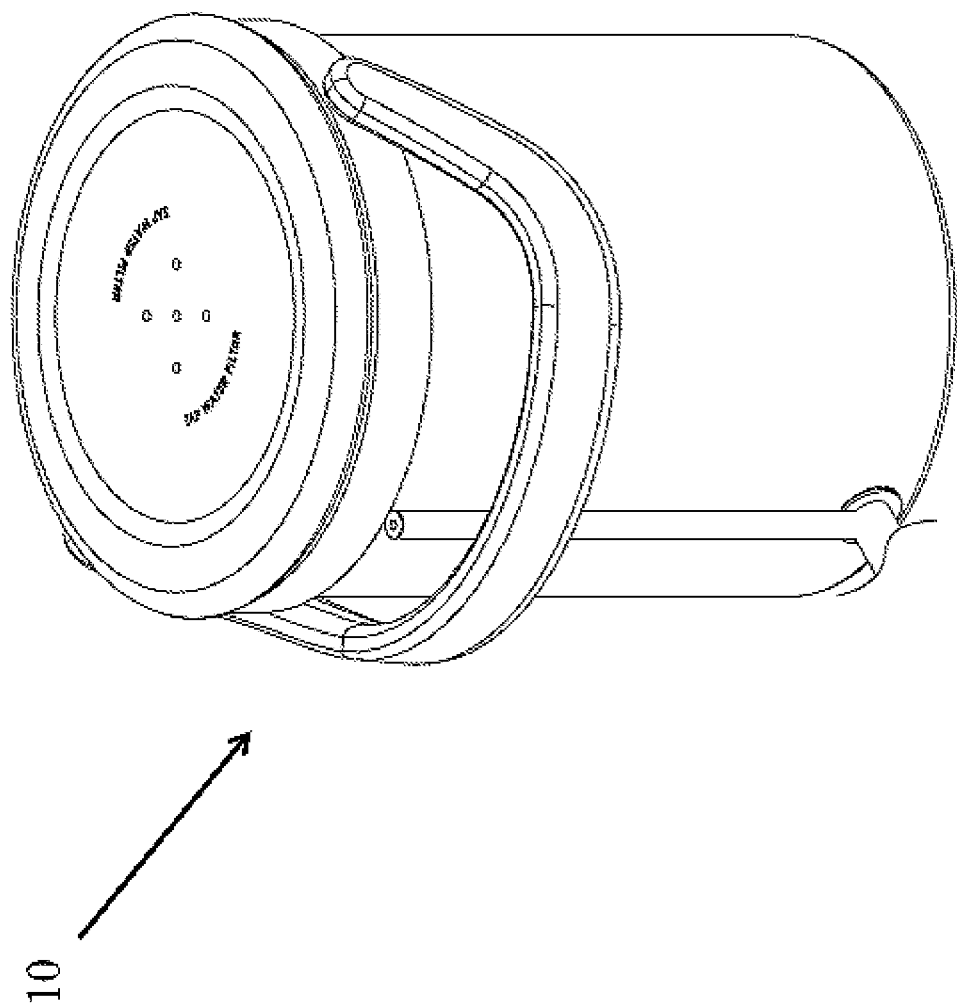
FIG. 1 is a perspective view of a water container containing a water filter system.
Figure 2:
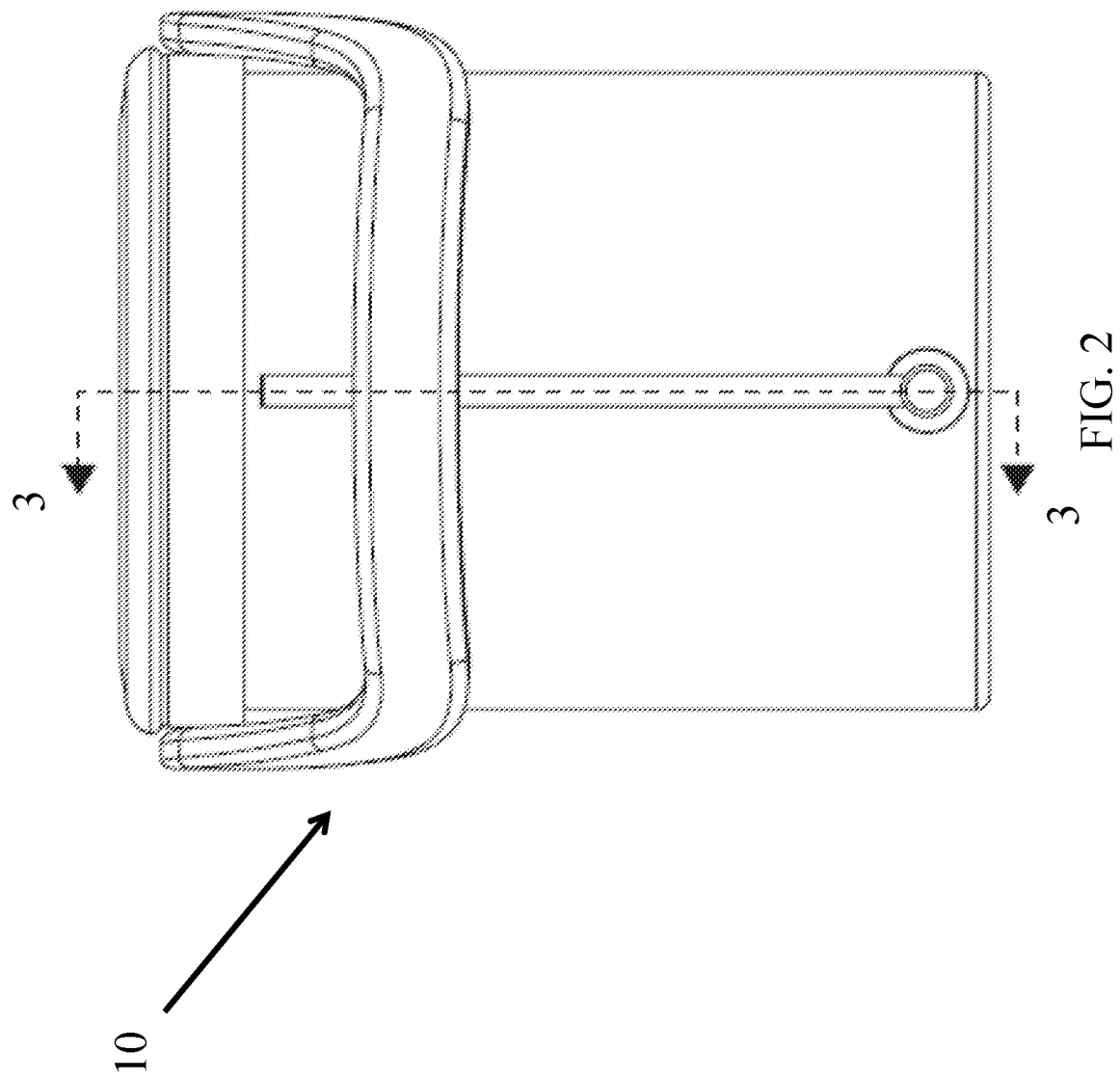
FIG. 2 is a side view of the water container from FIG. 1.
Figure 3:
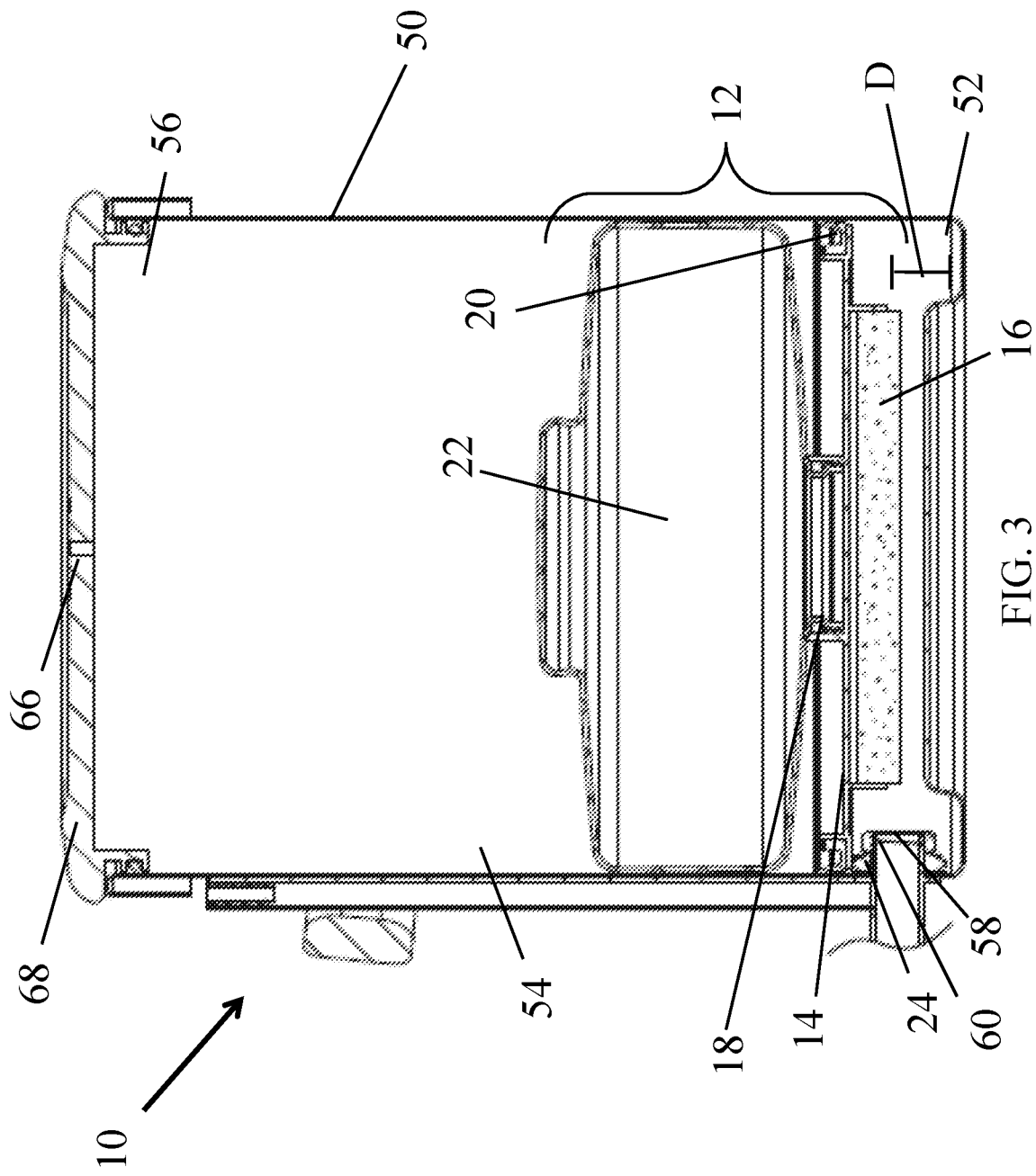
FIG. 3 is a section view taken along line 3-3 in FIG. 2, showing the water filter system.

FIGS. 1-3 illustrate a water container 10 with a water filter system 12. The water container 10 may be a water pitcher, a drink dispenser, or any other container used to carry water, such as a water bottle. The water filter system 12 as disclosed herein can be adapted to be used in any water container 10. FIG. 3 illustrates how the water filter system 12 may fit within the water container 10 shown. General operation of a floating filter system with a float and filter, and its interactions with walls of a container housing and the float, spout and seal is described in more detail in the other applications previously incorporated by reference herein.

As illustrated by FIGS. 3-6, the water filter system 12 may have a filter housing 14, a filter media 16, a filter coupling 18, a dynamic seal 20, a float 22, and a spacer 24. The filter housing 14 may have a top plate 26 and a bottom plate 28. The top plate 26 and the bottom plate 28 are water-permeable. The top plate 26 and the bottom plate 28 may be water-permeable because of the material out of which the top plate 26 and the bottom plate 28 are made. For example, the bottom plate 28 may be made of a cloth that allows water to pass through. Alternatively, the top plate 26 and the bottom plate 28 each may be water-permeable by having at least one hole 30 extending therethrough. The top plate 26 and the bottom plate 28 define the upper and lower limits of a cavity 32 within the filter housing 14. The filter housing 14 also has a housing width 34 and a housing height 36. The housing width 34 is the distance from one edge of the filter housing 14 through the center of the filter housing 14 to the opposite edge. The housing height 36 is the distance from the top of the top plate 26 to the bottom of the bottom plate 28. The housing width 34 may be at least two times the housing height 36. In such implementations, the filter housing is wider than it is tall. However, this is not always required.

The filter media 16 is located within the cavity 32 of the filter housing 14. In implementations where the bottom plate 28 has at least one hole 30, when water travels down through the filter media 16 and the bottom plate 28, air pockets or bubbles sometimes get trapped within the at least one hole 30, unable to rise back up through the filter media 16, but unable to pass below the bottom plate 28. This interferes with the water filtering process. To limit air pocket formation, in some embodiments, the filter media 16 may extend through the bottom plate 28 of the filter housing 14 (see FIGS. 5 and 7). In such implementations, the at least one hole 30 is filled with filter media 16, making it less likely that air pockets will form. Alternatively, the bottom plate 28 may be designed to drain the air pockets to the edge of the filter housing 14. For example, the at least one hole 30 may be configured as a slot that extends toward an edge of the filter housing 14 above the bottom of the filter media. In such an embodiment, as air pockets form, they are encouraged to travel to the edge of the filter housing through the shape of the filter housing where the interference with the water filtering process is diminished. The bottom of the bottom plate 28 may also have channels that extend from the at least one hole 30 to the edge of the filter housing 14 to help drain the air pockets to the edge of the filter housing 14. Other methods for limiting air pocket formation may also be implemented.

Figure 8A:
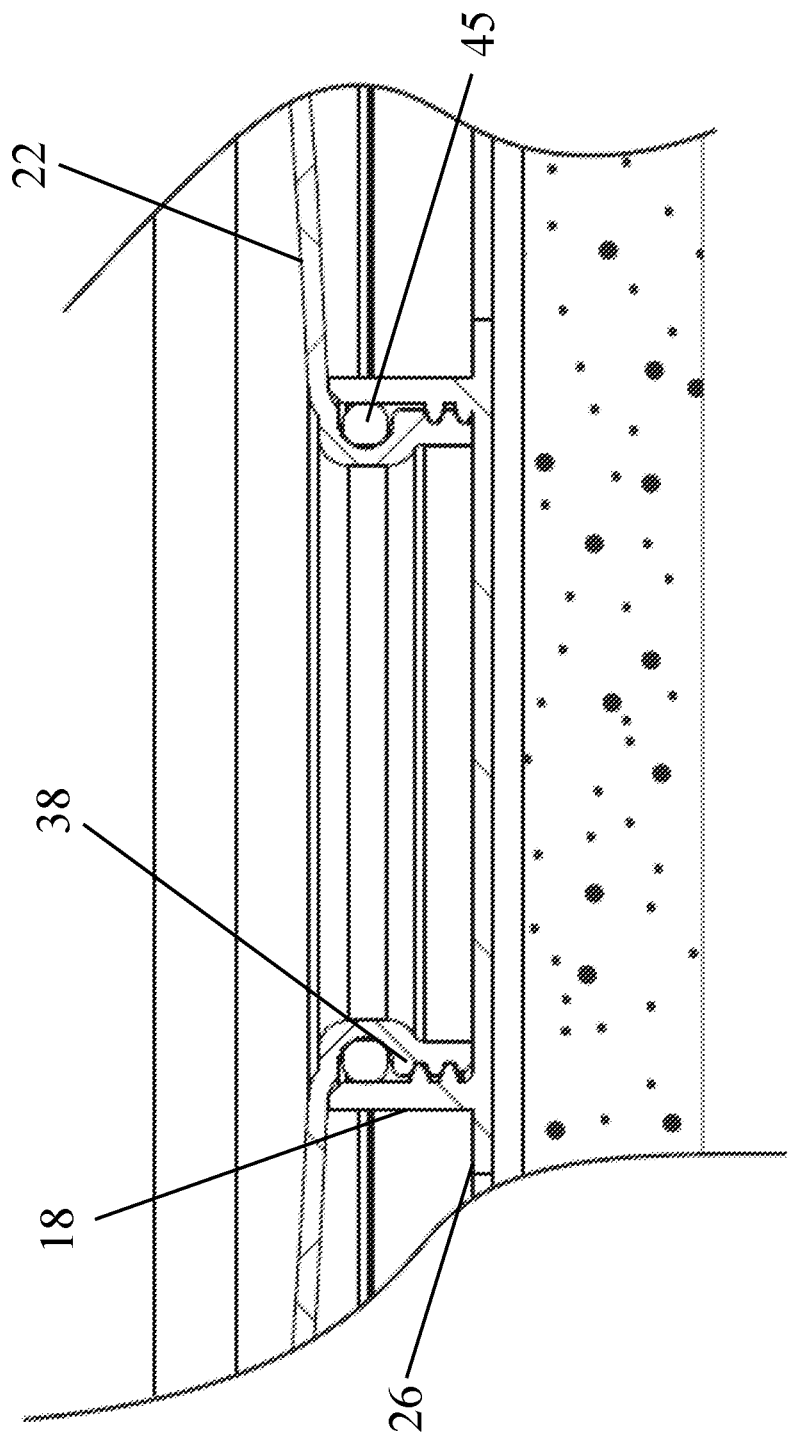
FIG. 8A is a close up view of the filter coupling of the filter housing.
Figure 8B:
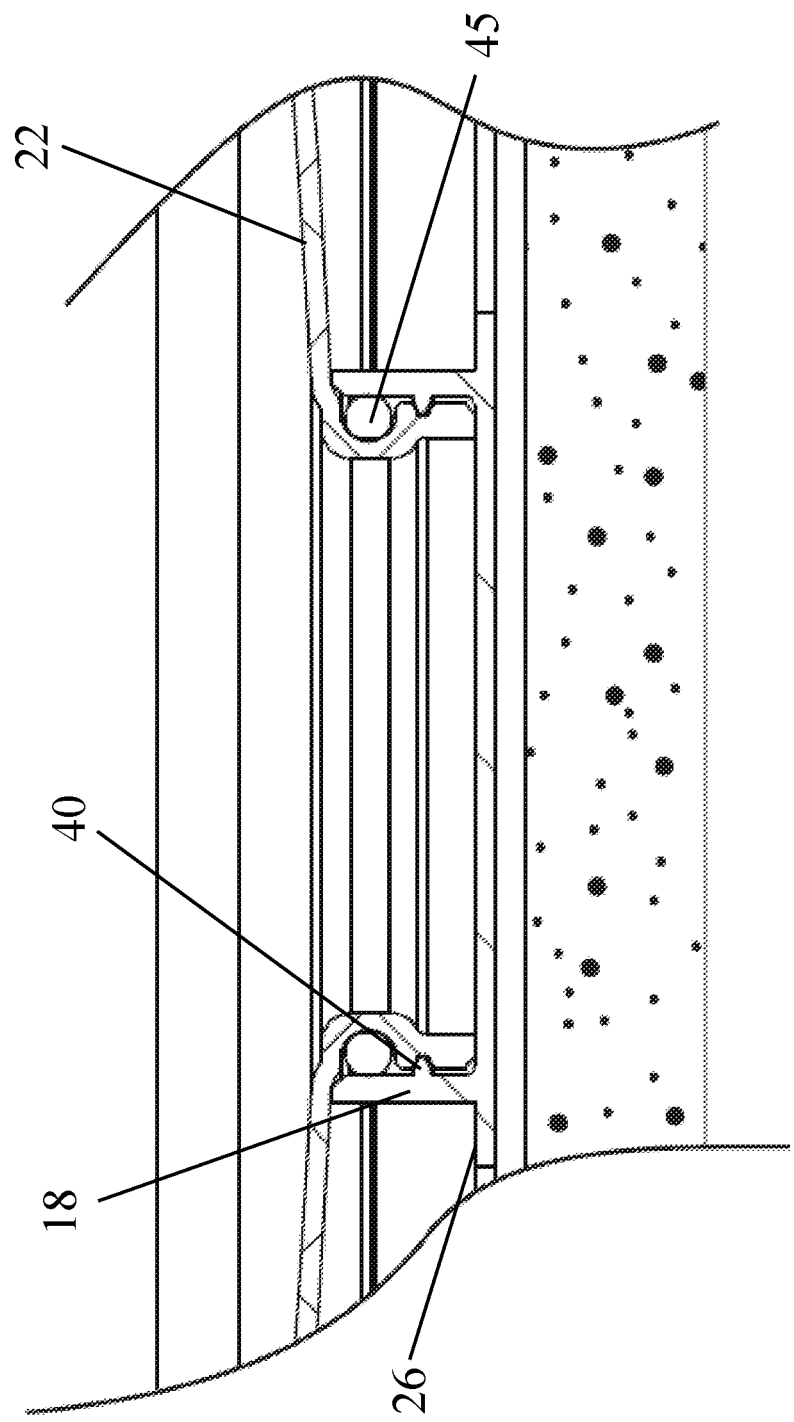
FIG. 8B is a close up view of a second embodiment of the filter coupling of the filter housing.

The filter coupling 18 extends upward from the top plate 26 of the filter housing 14 and is configured to attach to the float 22. The filter coupling 18 may be threaded and may attach to the float 22 by coupling with a threaded portion 38 of the float 22, as shown in FIG. 8A. In such an implementation, the filter housing 14 screws on to the float 22. Alternatively, the filter coupling 18 may have a lip 40 configured to snap on to the float 22, as shown in FIG. 8B. In such an embodiment, the filter housing 14 is pressed against the float 22 until the lip 40 snaps onto and engages with the float 22. Other methods for attaching the filter housing 14 to the float 22 are contemplated, including the use of fasteners, an adhesive, or a weld.

Figure 4:
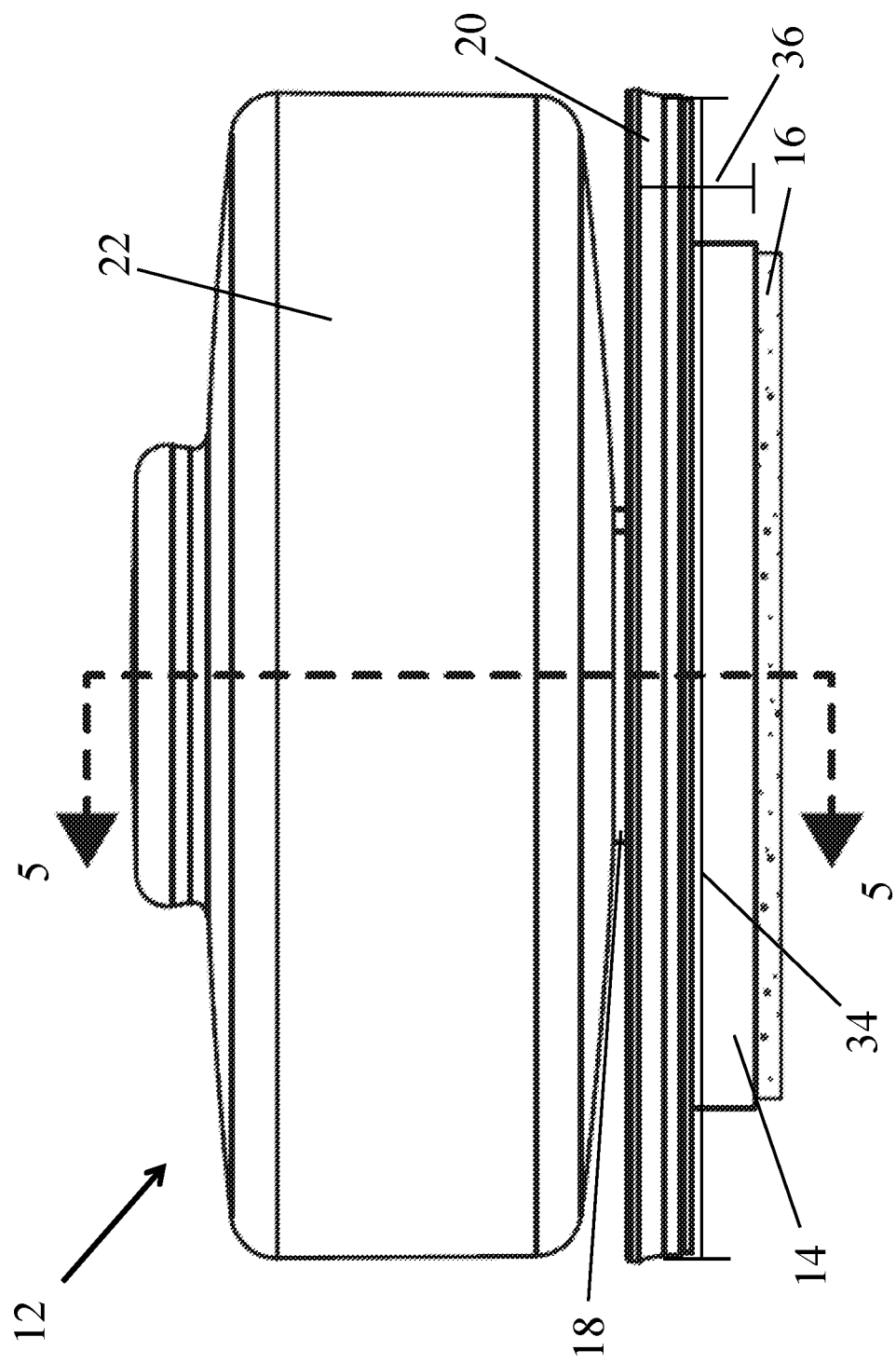
FIG. 4 is a side view of the water filter system from FIG. 3.
Figure 5:
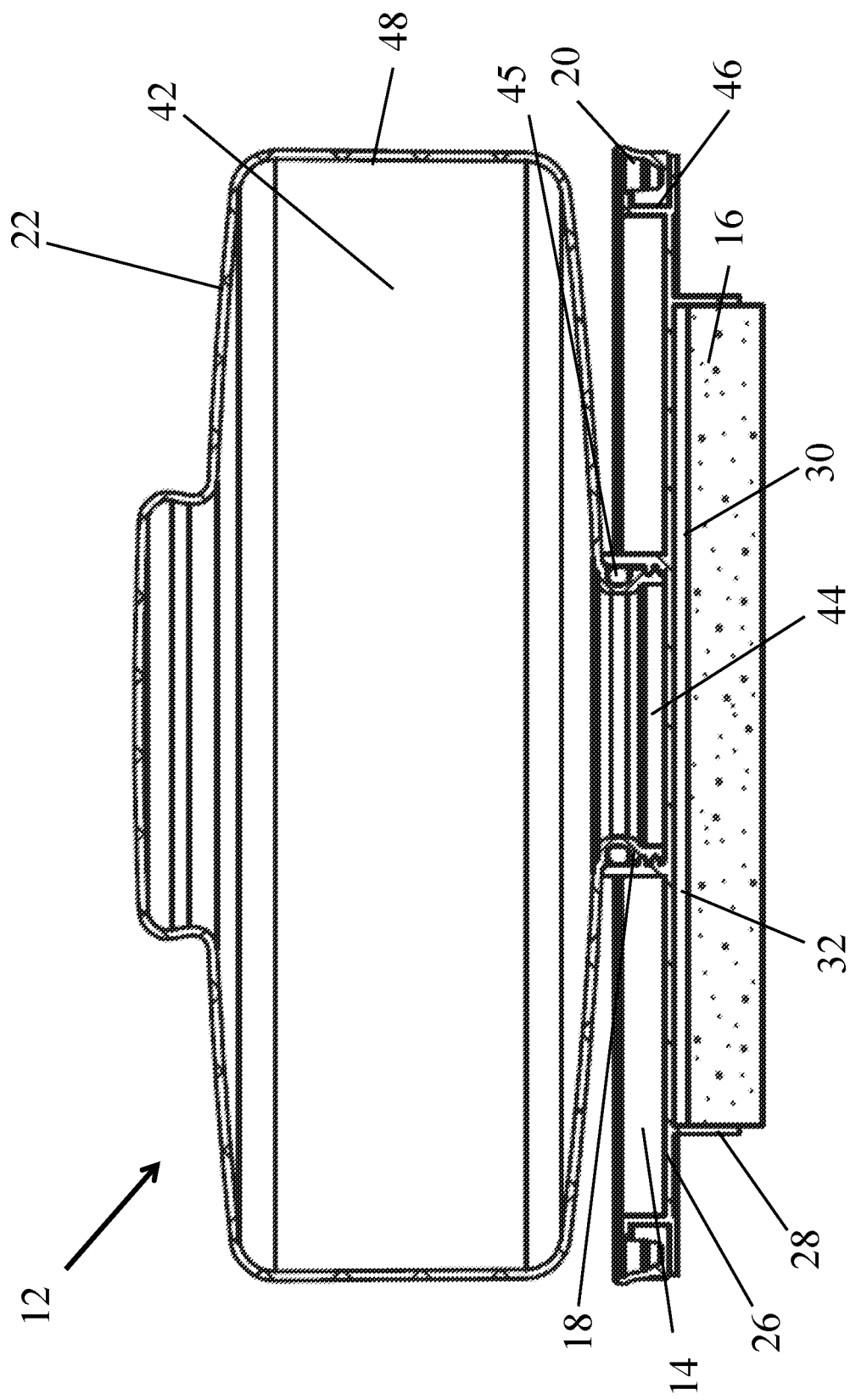
FIG. 5 is a section view taken along line 5-5 in FIG. 4.
Figure 6:
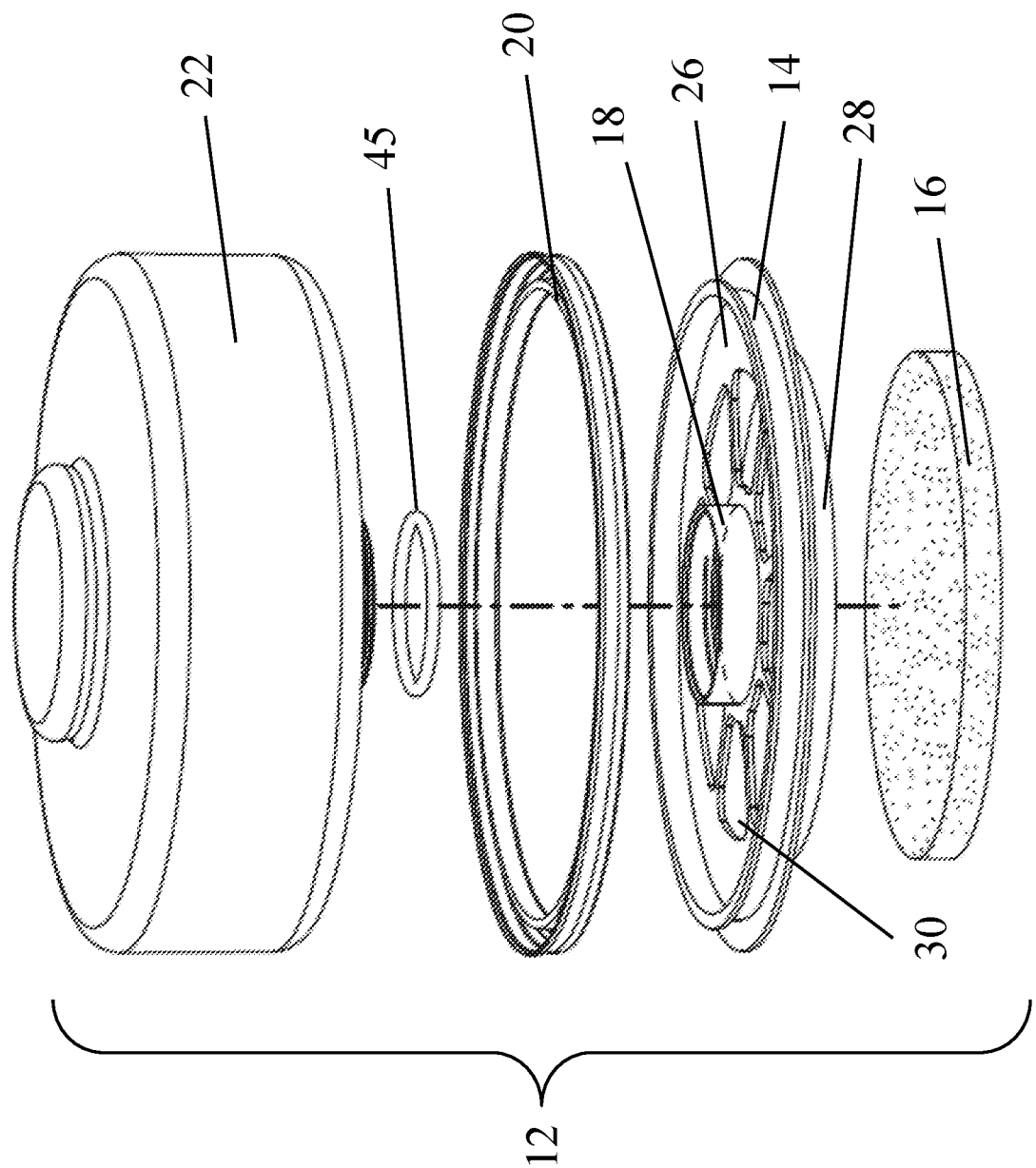
FIG. 6 is an exploded view of the water filter system from FIG. 3.

Specifically in regard to FIGS. 4-6, the float 22 has at least one air chamber 42 within the float 22. The float may have an opening 44 into the air chamber 42. When the filter housing 14 is attached to the float 22, the filter coupling 18 may cover the opening 44 and restrict water access to the inside of the float 22. An O-ring 45 may be included to further restrict water access to the inside of the float 22. The float 22 may be any shape or size, and may be made of any material, including stainless steel. The float 22 is configured to provide an upward buoyant force to the water filter system 12 when the water container 10 is filled with water. As the water filter system 12 rises through the water due to this buoyant force, the water travels through and is filtered by the filter media 16, and can then be poured from the water container 10 and consumed.

The dynamic seal 20 is coupled to the filter housing 14 along a perimeter 46 of the filter housing 14. The dynamic seal 20 is configured to extend out beyond a perimeter 48 of the float 22 and maintain contact with a wall 50 of the water container 10 when the water filter system 12 is in a bottom position near a bottom 52 of the water container 10 (see FIGS. 9A, 9B, 9C, and 9F), when the water filter system 12 is in an intermediate position near a center 54 of the water container 10 (see FIG. 8D), and when the water filter system 12 is in a top position near a top 56 of the water container 10 (see FIG. 8E). By maintaining contact with the wall 50 throughout its motion from the bottom 52 of the water container 10 to the top 56 of the water container 10, the dynamic seal 20 restricts water from passing between the dynamic seal 20 and the wall 50 of the water container 10.

The spacer 24 is located adjacent the bottom 52 of the water container 10 and is configured to maintain a minimum distance D between the bottom 52 of the water container 10 and the bottom plate 28 of the filter housing 14 (FIG. 3). The spacer 24 restricts movement of the water filter system 12 below a predetermined level within the water container 10 and creates a gap for creation of larger water droplets on the bottom of the filter until the water rises to the bottom of the filter system 12 to reduce the initial effects of water surface tension on the ability of the water to pass through the filter into the bottom of the container. In some embodiments, the spacer may be one or more structures, components or parts formed as part of the filter housing 14 or added within the water container, but in all cases, the spacer 24 is located adjacent the bottom 52 of the water container 10 when the filter housing 14 is lowered. Once the water fills to the bottom of the filter, water surface tension does not affect the flow of water through the filter in a meaningful way. For the specific example shown in FIG. 3, the spacer 24 is configured as an internally threaded nut used to hold the spout opening 58 in place. In other embodiments, however, the spacer 24 may be any structure that maintains the filter above the bottom 52 of the water container 10. It is also specifically contemplated that a spacer may be included as part of the bottom 52 of the water container, such as a raised portion adjacent an edge of the bottom 52, at the center of the bottom, or anywhere else within the water container 10 that provides a stop for the moving filter system to stop before it reaches the bottom of the filter housing. Thus, although a particular example of a spacer is shown in FIG. 3, it is intended to be an example to represent any structure or structures provided for spacing a majority of a bottom surface of the filter from engaging the bottom of the water container 10.

It was discovered during development that maintaining an initial space for the water droplets to form on the bottom of the filter system 12 enabled a faster flow of water through the filter system 12 than when the water filter system 12 was lowered to the bottom 52 of the water container 10. With the spacer 24 in place, the water may filter through the filter media 16 at a faster pace.

Figure 7:
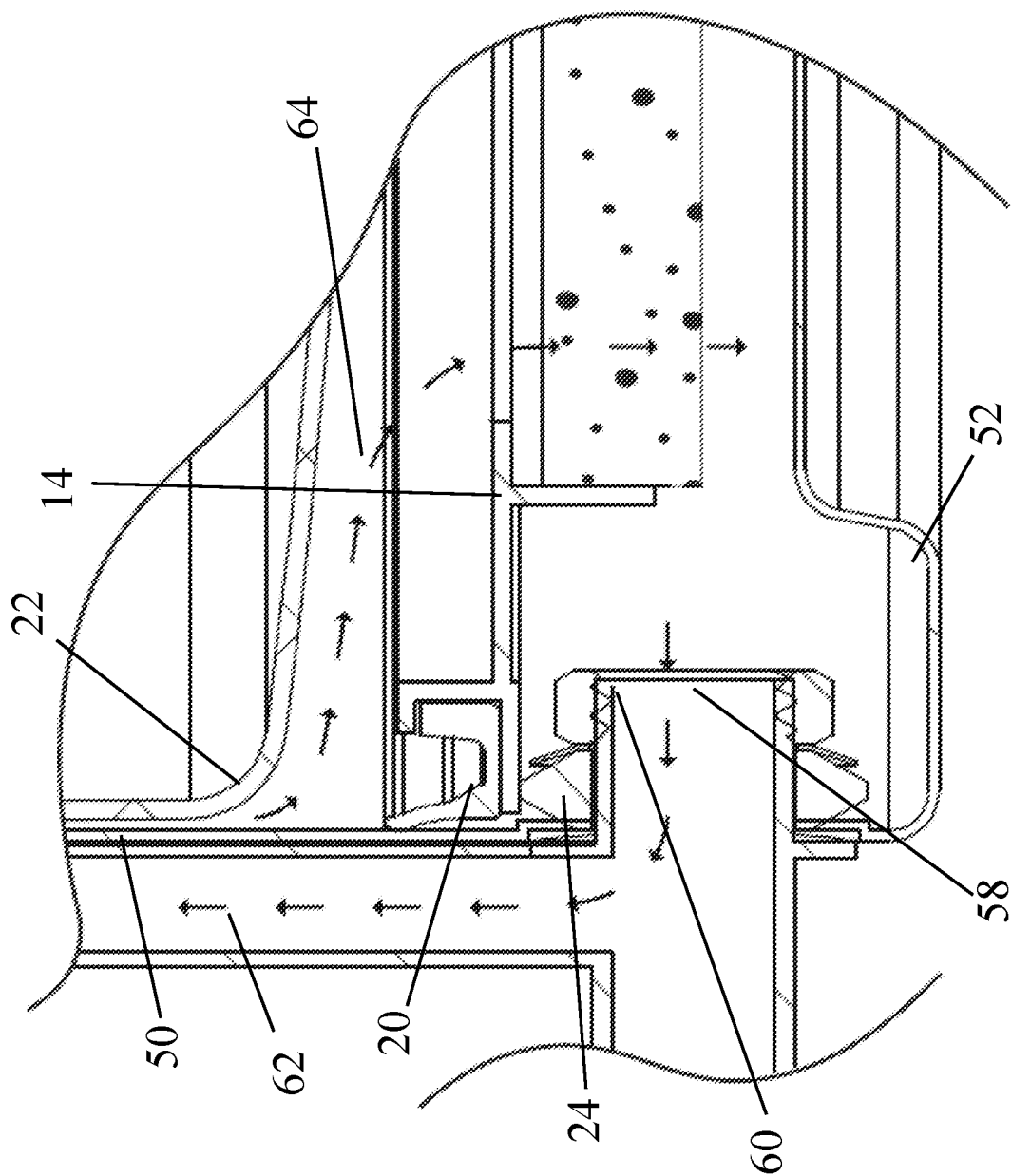
FIG. 7 is a close up view of the filter media within the filter housing of the water filter system.
Figure 9A:
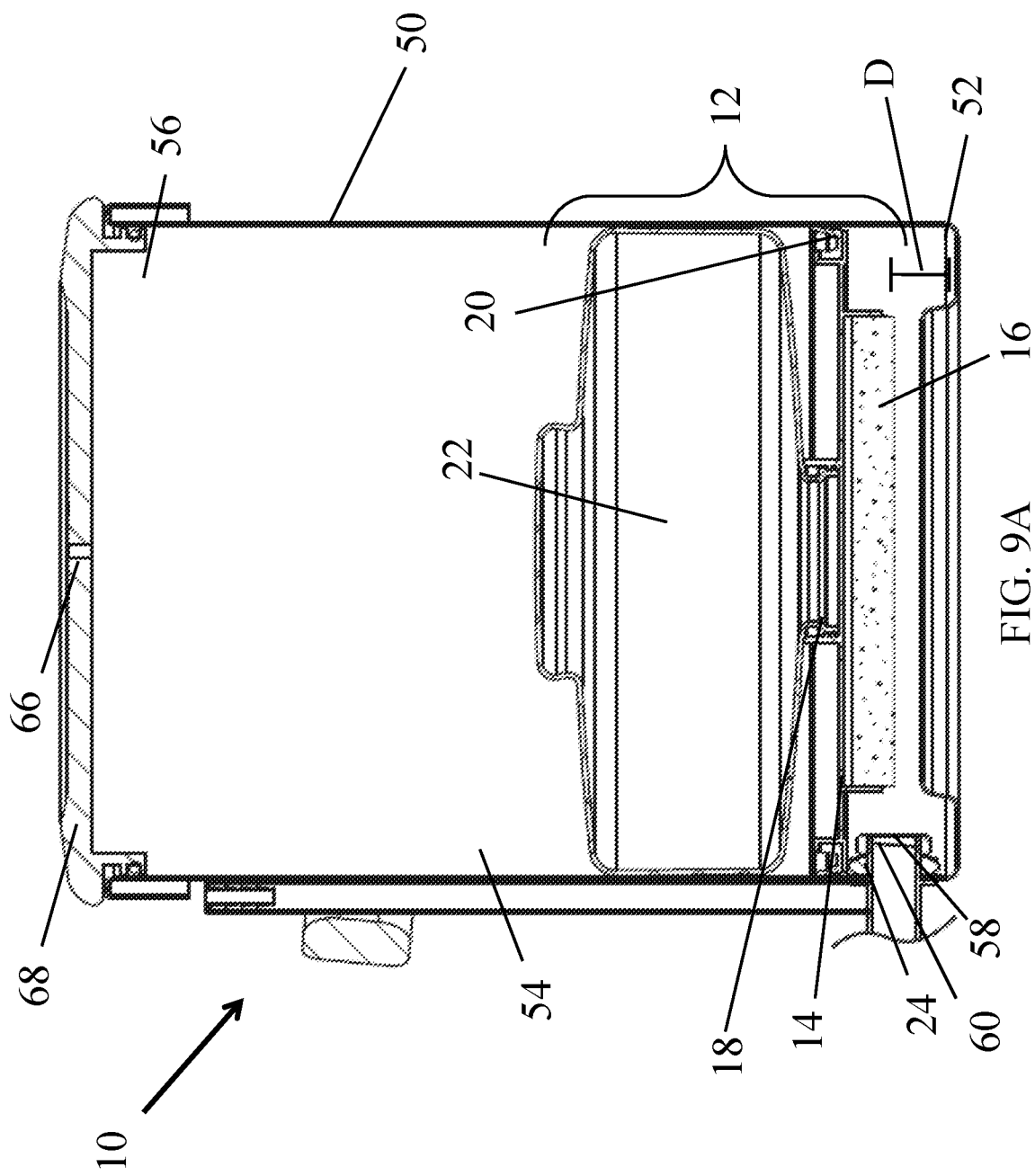
FIG. 9A is a cross section view of a water container with a water filter system at the bottom of the water container, where the water container contains no water.
Figure 9C:
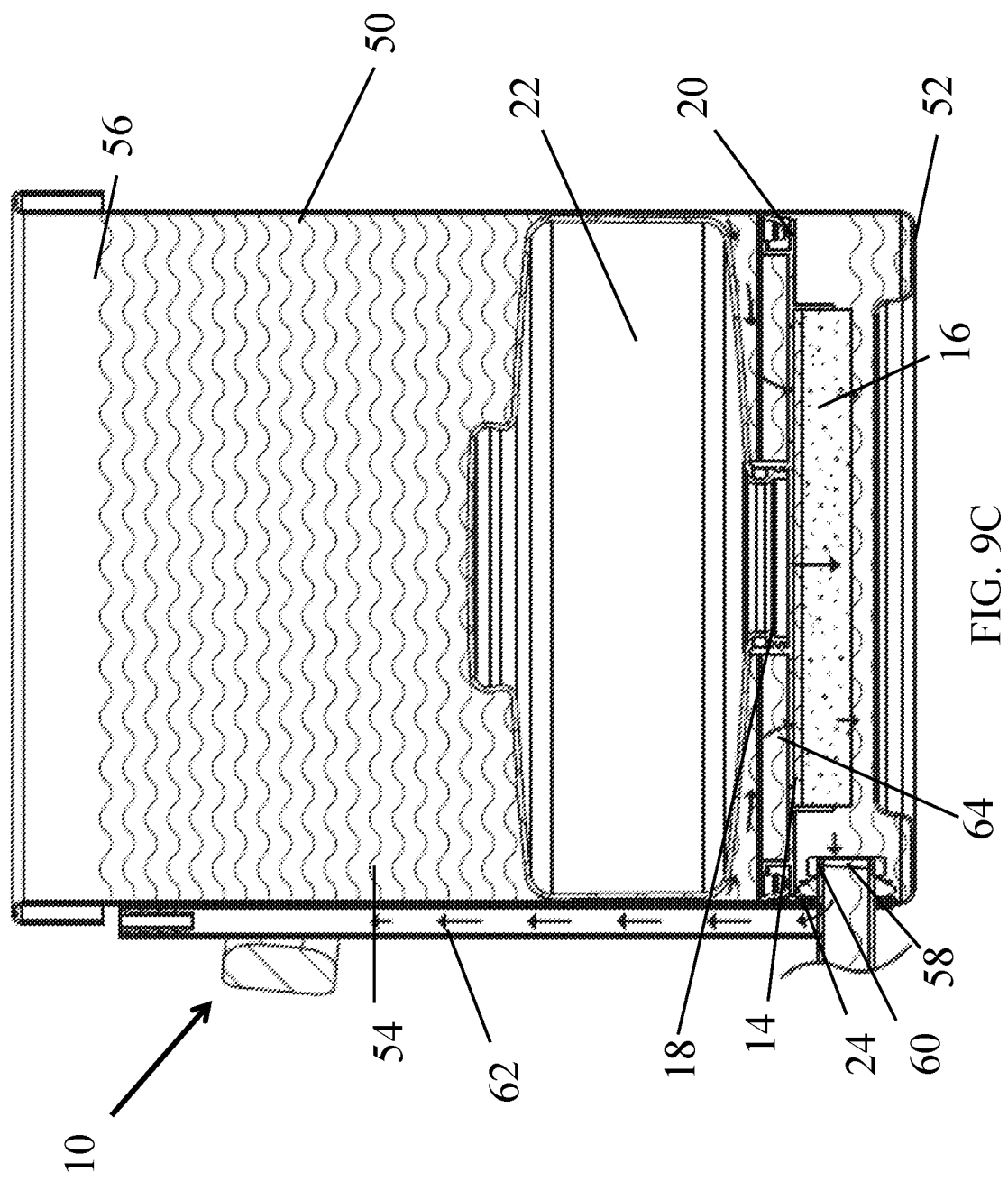
FIG. 9C is a cross section view of the water container of FIG. 9A filled with water, where the water filter system is beginning to filter water and air is venting out from beneath the water filter.
Figure 9D:
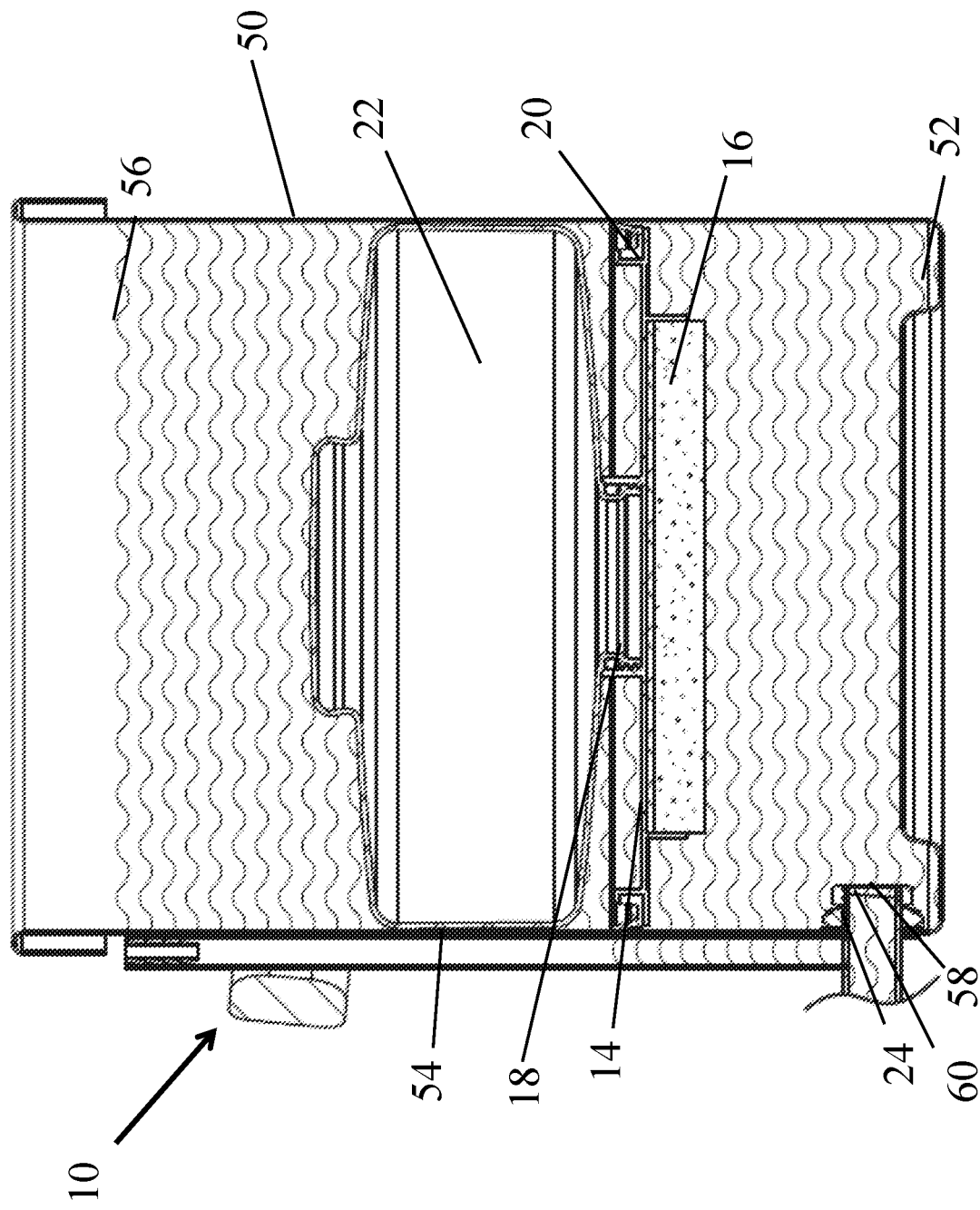
FIG. 9D is a cross section view of the water container of FIG. 9A filled with water, where the water filter system is rising up through the water container and filtering the water as the water filter system rises.

The water container 10 includes a spout opening 58 adjacent the bottom 52 of the water container 10. When the bottom plate 28 of the filter housing 14 is at the minimum distance D from the bottom 52 of the water container 10, as illustrated by FIGS. 7 and 9C, the filter media 16 extends below a top edge 60 of the spout opening 58. This allows air below the filter media to vent through the spout (airflow is indicated by arrows 62) as water filters through the filter media 16 (water flow is indicated by arrows 64). Such a configuration limits the amount of air that may be trapped below the water filter system once the float 22 lifts the filter housing 14 off of the spacer 24, as shown in FIG. 9D. Allowing the air to escape from the bottom surface of the filter media 16 also allows for the water to filter through the filter system 12 at a faster pace.

Figure 9E:
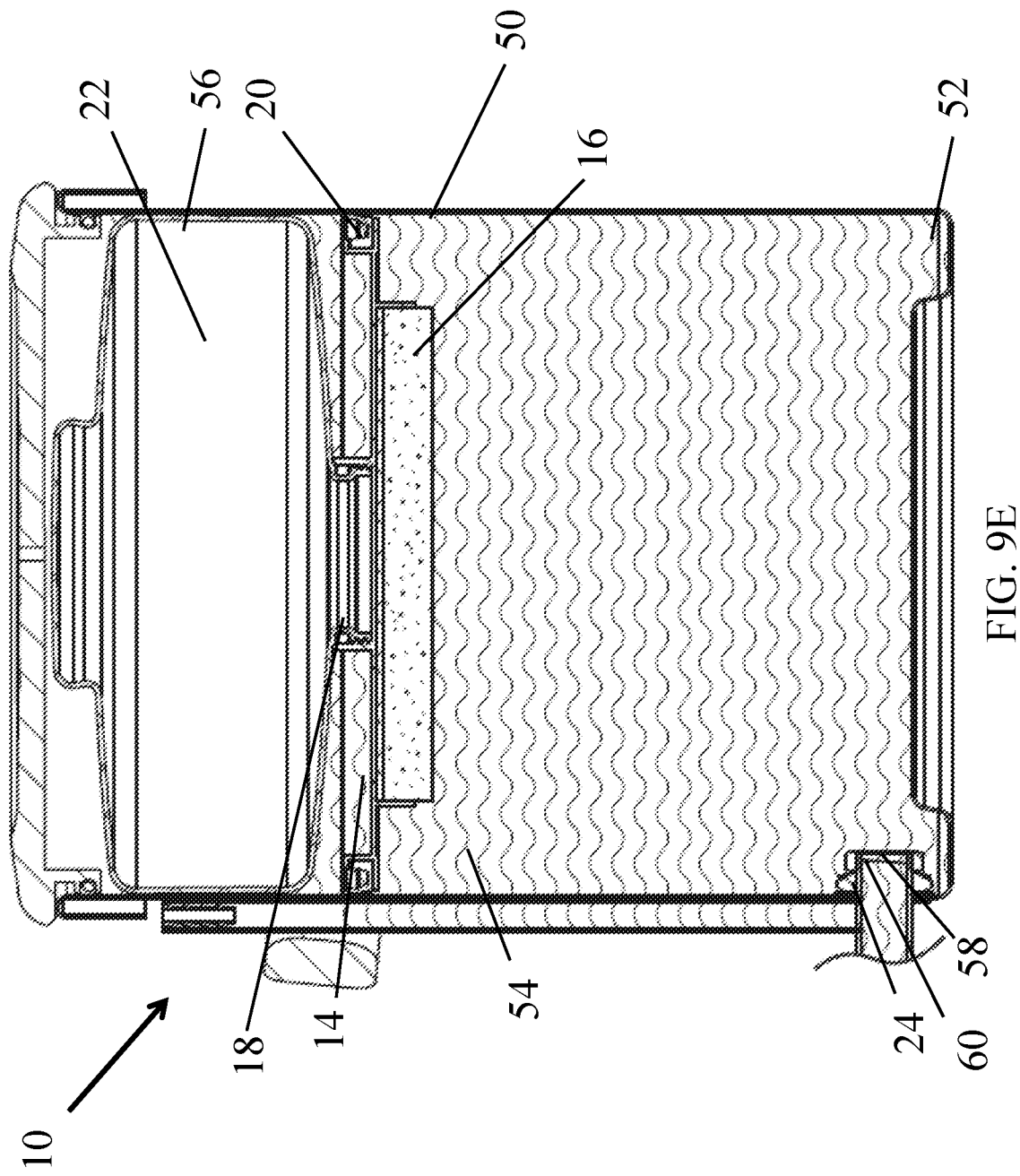
FIG. 9E is a cross section view of the water container of FIG. 9A, where the water filter system has filtered all of the water and is floating at the top of the water container.
Figure 9F:
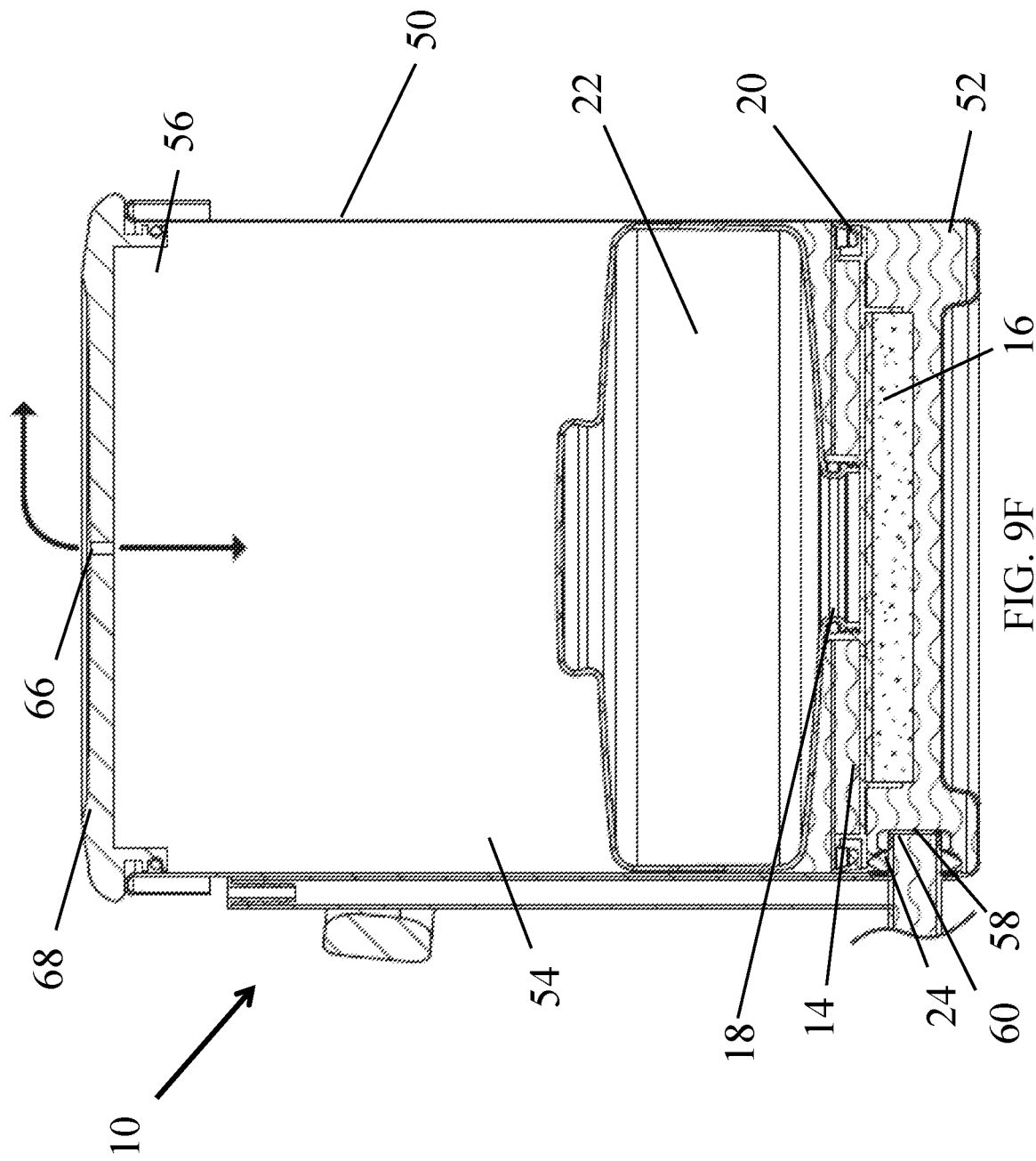
FIG. 9F is a cross section view of the water container of FIG. 9A, where the filtered water has been emptied from the water container and the water filter system has returned to the bottom of the water container.

As illustrated in FIGS. 9E-9F, when water is poured from the water container 10, a venting hole 66 in a lid 68 of the water container 10 allows air to enter into the water container 10 above the water filter system 12, thus allowing the water filter system 12 to lower with the water level until the water filter system 12 rests on the spacer 24, or the spacer 24 formed as part of the filter system 12 is stopped on a surface of the water container 10 or spout. For all of the embodiments disclosed herein, the combination of the venting hole 66 in the lid 68 and the vent in fluid communication with the spout allow the filter system to achieve equilibrium whether the float is raising or lowering within the water container 10 and enhance the flow of water through the filter system 12.

Figure 10A:
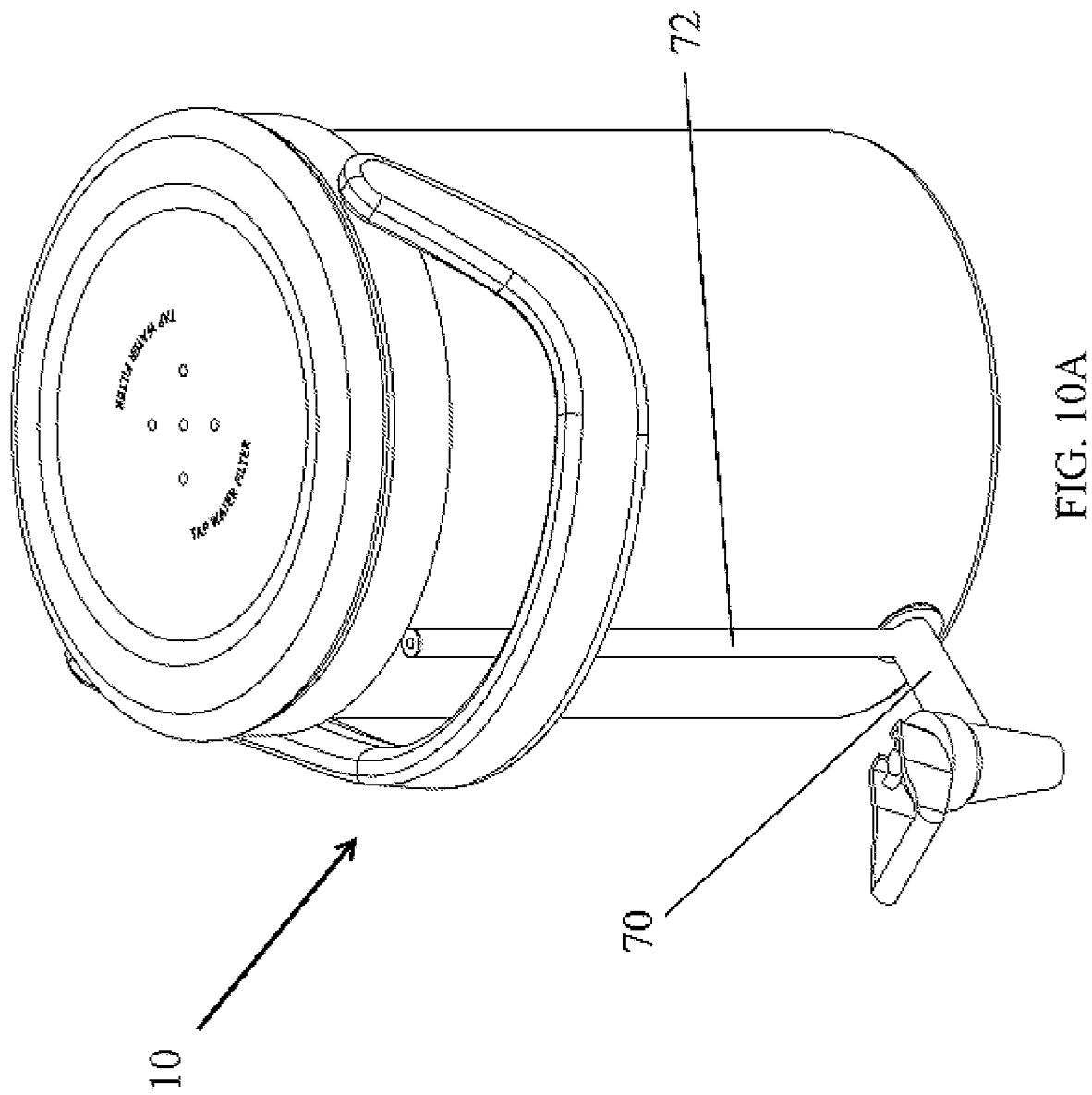
FIG. 10A is a perspective view of an embodiment of the water container, where the spout is a spigot with a release valve.
Figure 10C:
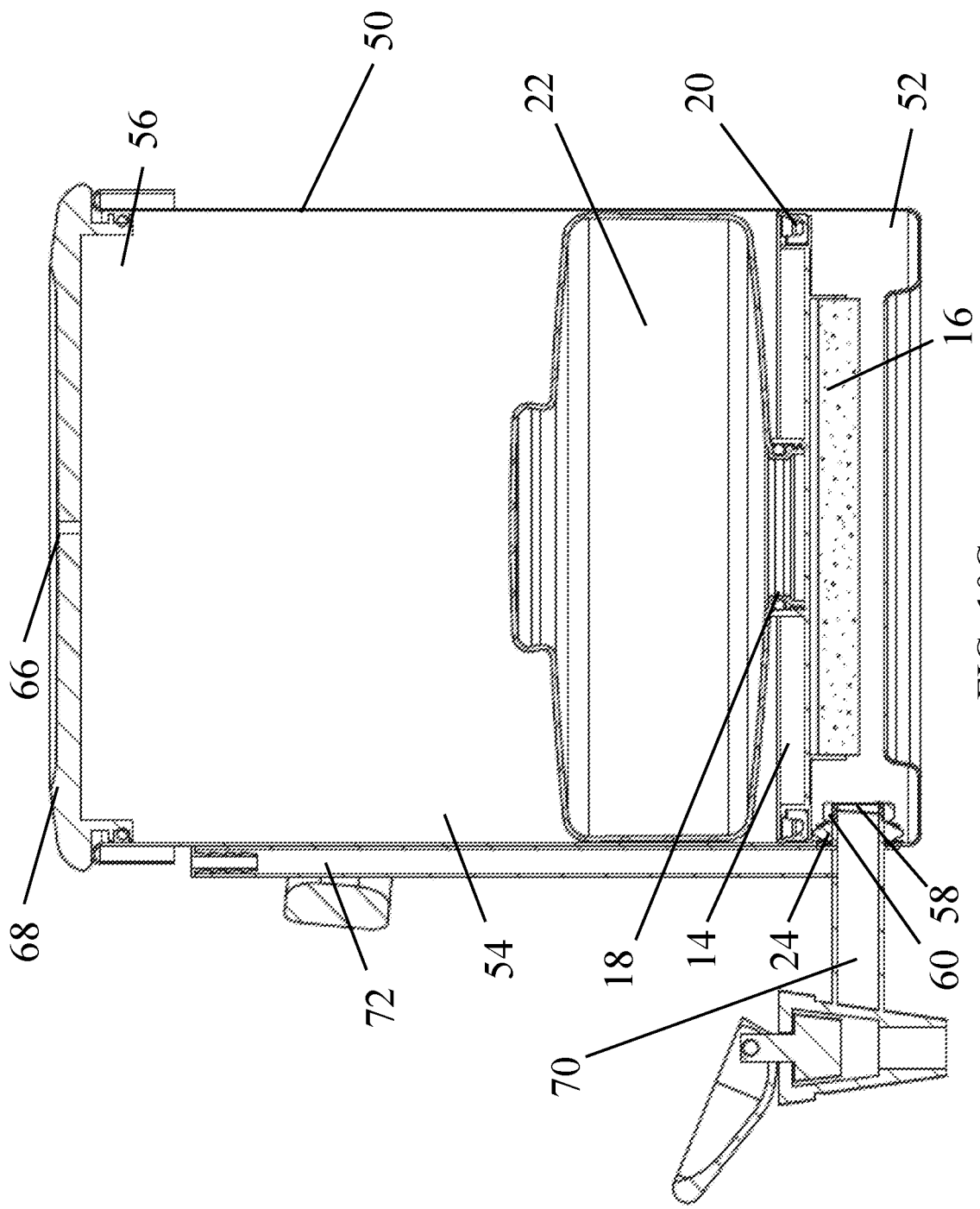
FIG. 10C is a section view of the water container taken along line 10-10 in FIG. 10B.

FIGS. 10A-10C illustrate an embodiment of the water dispensing device for the water container 10. In this embodiment, a spout 70 near the bottom 52 of the water container 10 extends from the spout opening 58. The spout 70 may be a spigot with a release valve, as shown. Extending upward from the spout 70, there is a vent 72 in fluid communication with the spout opening 58. When water is first poured into the water container 10, air vents out of the water container 10 through the spout opening 58 and up through the vent 72. Once a majority of the air has vented from beneath the water filter system 12, water may also enter into the vent 72. This helps to equalize the air pressure between the area above the water filter system 12 and the area beneath the water filter system 12, allowing the water filter system to function properly.

Figure 11A:
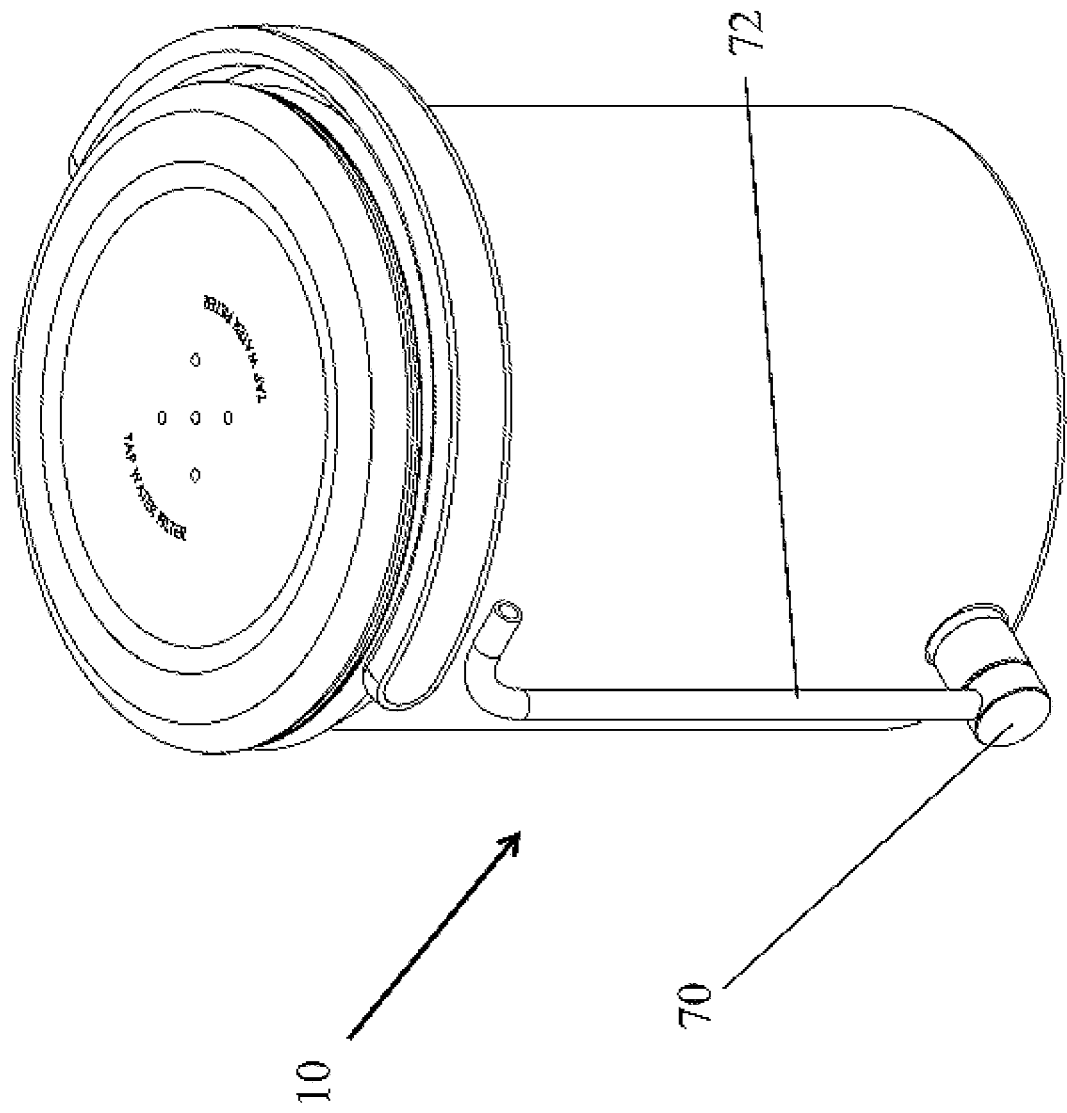
FIG. 11A is a perspective view of another embodiment of the water container, where the spout is combined with the vent.
Figure 11B:
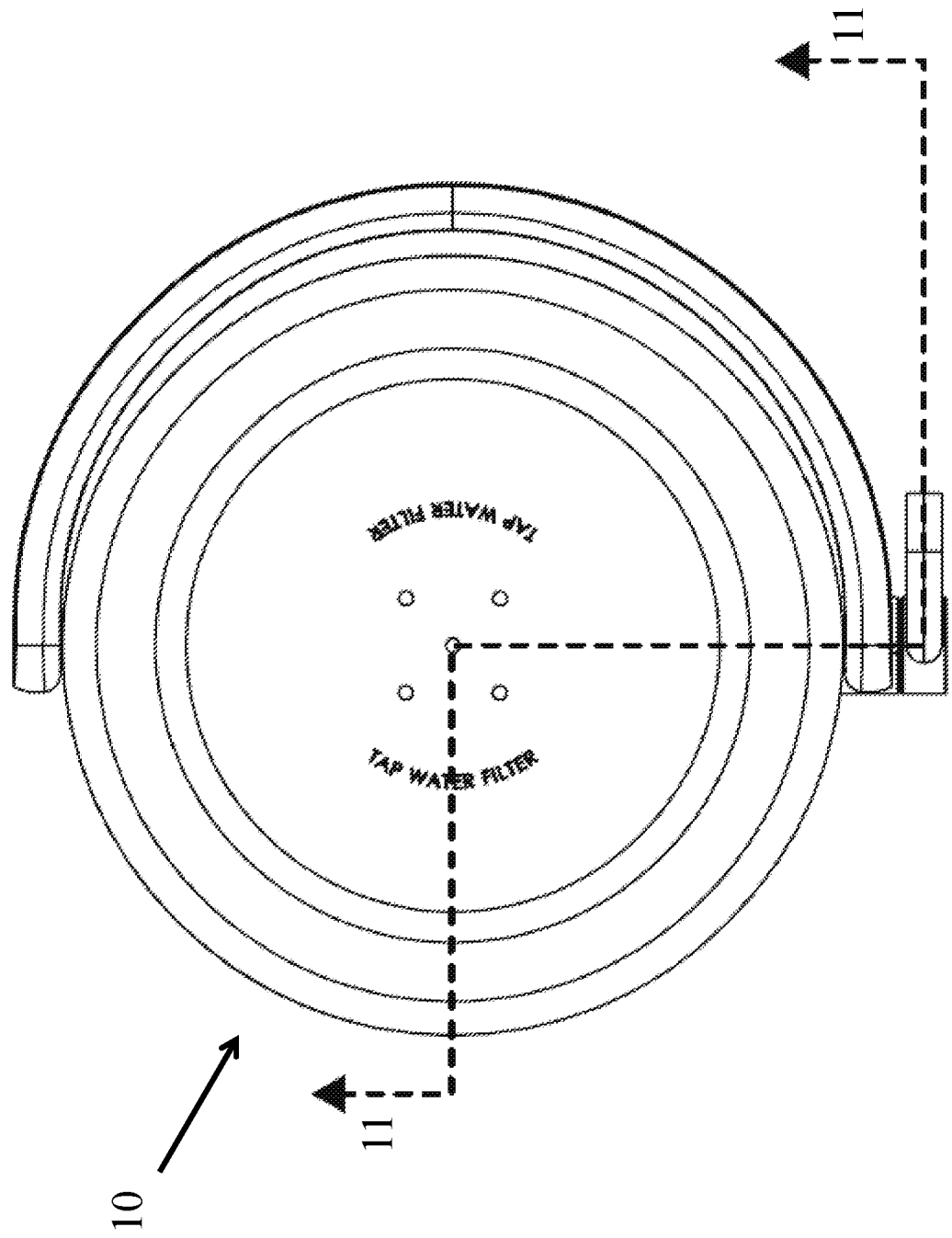
FIG. 11B is a top view of the water container from FIG. 11A.
Figure 11C:
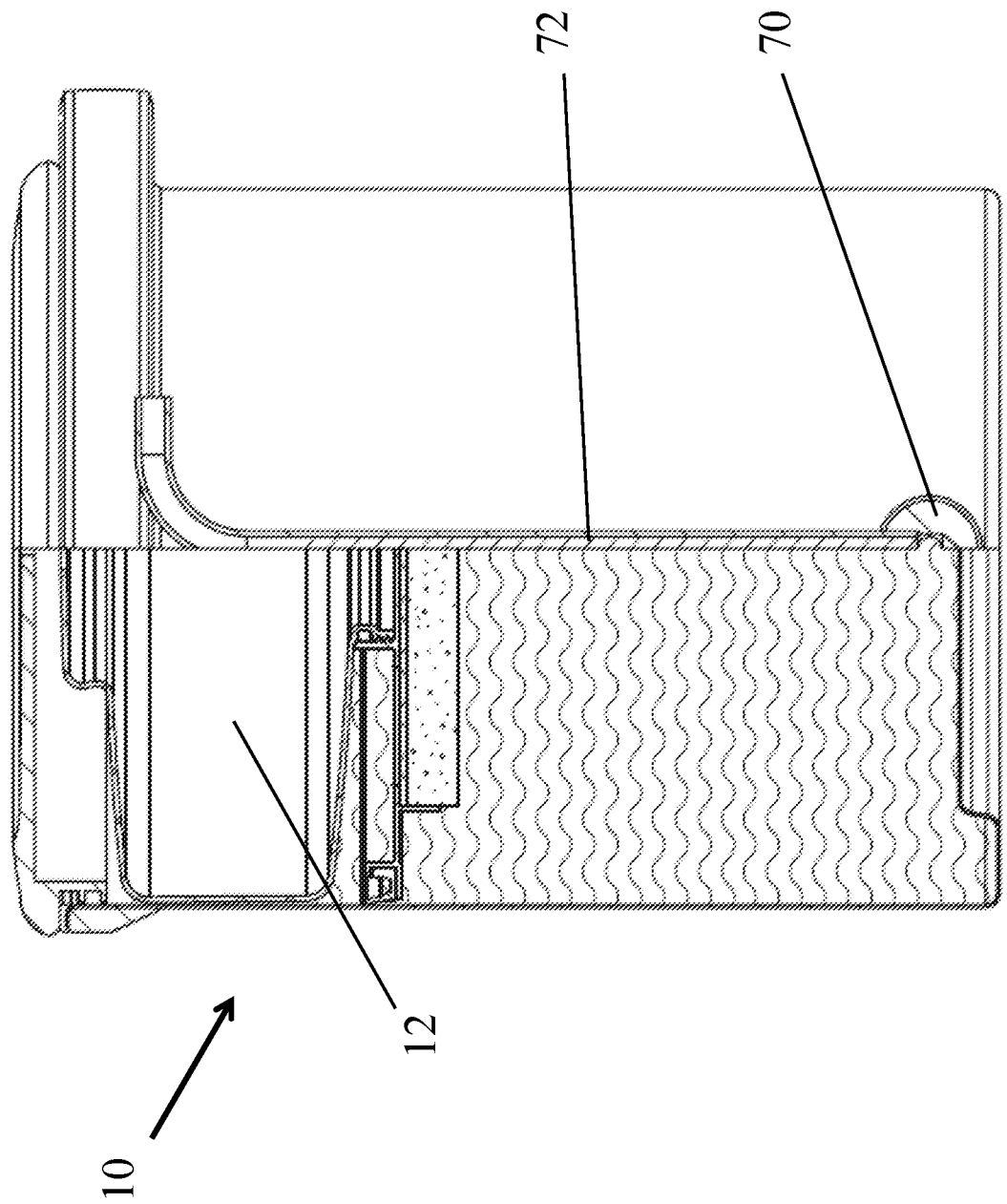
FIG. 11C is a section view of the water container taken along line 11-11 in FIG. 11B, where the spout is in an upright, venting position.
Figure 11D:
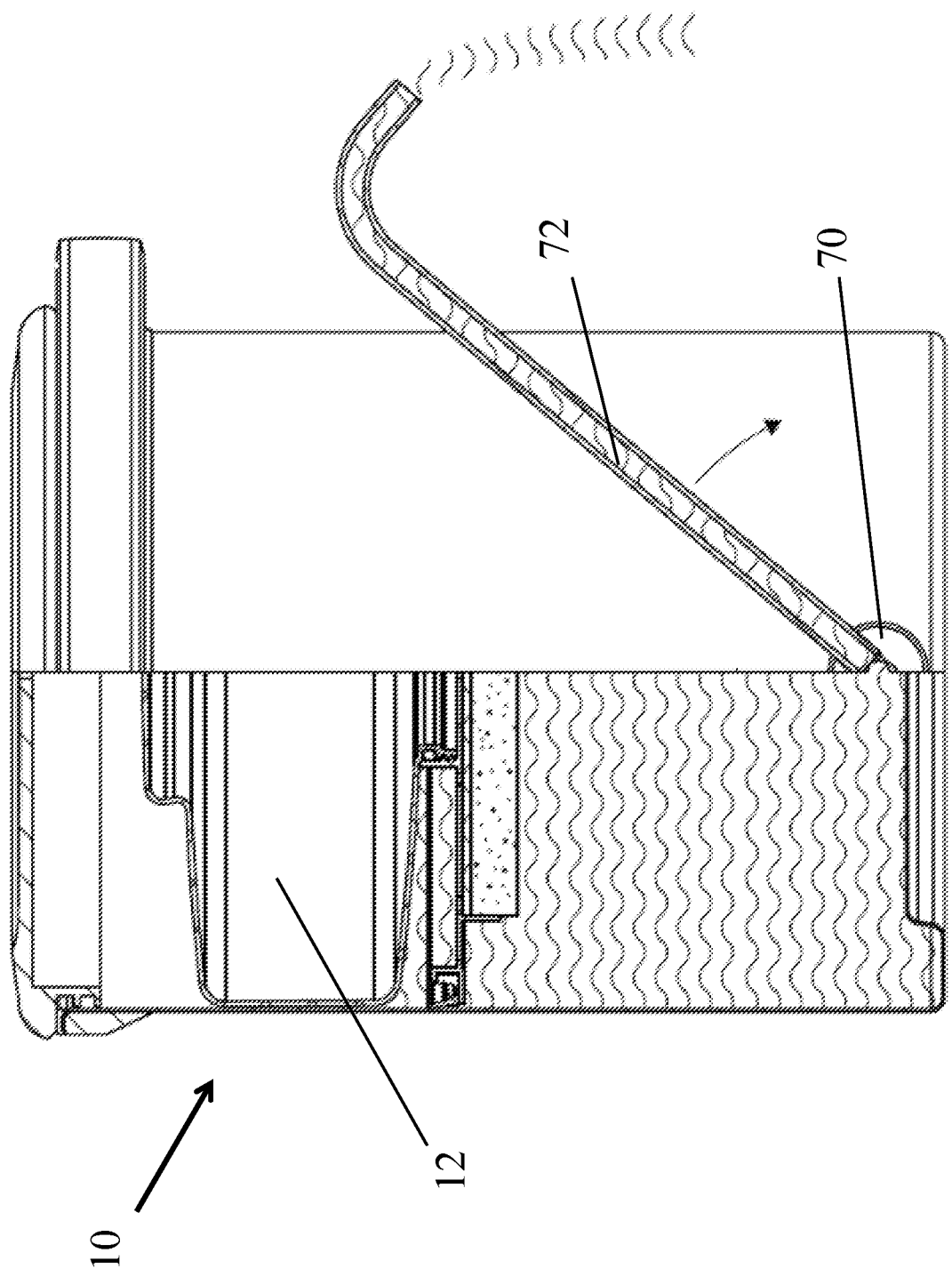
FIG. 11D is a section view of the water container taken along line 11-11 in FIG. 11B, where the spout is at an angled, pouring position and the water level in the water container is high enough for water to pour through the spout.
Figure 11E:
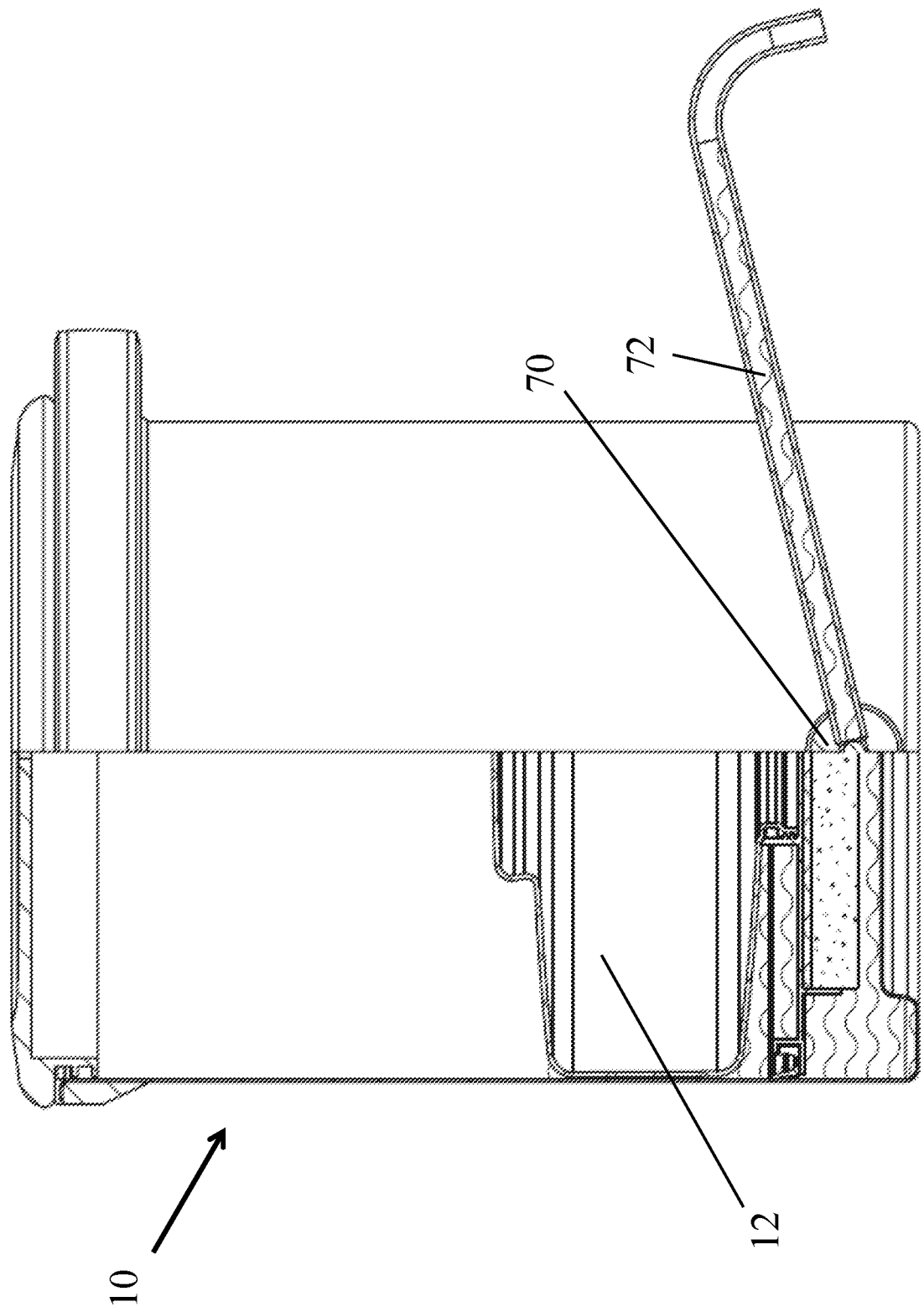
FIG. 11E is a section view of the water container taken along line 11-11 in FIG. 11B, where the spout is at an angled, pouring position but the water level in the water container is too low for water to pour through the spout.

FIGS. 11A-11E illustrate another embodiment of the water dispensing device for the water container 10. In this embodiment, the spout 70 is combined with the vent 72 as a single passageway. The spout 70 is capable of rotating. This allows the spout 70 to begin in an upright, venting position, as shown in FIG. 11A and FIG. 11C. When in this position, the spout 70 performs the same function as the vent 72 in the embodiment shown in FIGS. 10A-10C. To pour water from the spout 70, the spout may be rotated to an angled, pouring position as shown in FIG. 11D and FIG. 11E. As long as the water level inside of the water container 10 remains higher than the end of the spout 70 and vent 72, as shown in FIG. 11D, water will pour from the spout 70 due to the water pressure coming from inside the water container 10. However, once the water level drops below the end of the spout 70 and vent 72, water will stop pouring from the spout 70, as shown in FIG. 11E.

It will be understood that implementations of water filter systems are not limited to the specific assemblies, dispensing devices, other devices and components disclosed in this document, as virtually any assemblies, devices and components consistent with the intended operation of water filter systems. Accordingly, for example, although particular water filter systems, and other assemblies, devices and components are disclosed, such may include any shape, size, style, type, model, version, class, measurement, concentration, material, weight, quantity, and/or the like consistent with the intended operation of water filter systems. Implementations are not limited to uses of any specific assemblies, devices and components; provided that the assemblies, devices and components selected are consistent with the intended operation of water filter systems.

Accordingly, the components defining any water filter systems implementations may be formed of any of many different types of materials or combinations thereof that can readily be formed into shaped objects provided that the components selected are consistent with the intended operation of a water filter system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various drinking water filters and housings may be manufactured using conventional procedures as added to and improved upon through the procedures described here. Some components defining drinking water filters and housings may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the methods involving drinking water filters and housings are not limited to the specific order of steps as disclosed in this document. Any steps or sequence of steps of the assembly of drinking water filters and housings indicated herein are given as examples of possible steps or sequence of steps and not as limitations, since various assembly processes and sequences of steps may be used to assemble them.

The implementations of the drinking water filters and housings described are by way of example or explanation and not by way of limitation. Rather, any description relating to the foregoing is for the exemplary purposes of this disclosure, and implementations may also be used with similar results for a variety of other applications requiring a drinking water filters and pathways for guiding water through them.

What is claimed is:

1. A water filter system, comprising:
   a filter housing having:
      a top plate and a bottom plate, wherein the top plate and the bottom plate each are water-permeable;
      a cavity defined by the top plate and the bottom plate; and
      a housing width and a housing height, wherein the housing width is at least two times the housing height;
   a filter media within the cavity of the filter housing and extending and exposed through the bottom plate of the filter housing;
   a filter coupling extending upward from the top plate of the filter housing and configured to attach to a float; and
   a dynamic seal directly attached to the filter housing along a perimeter of the filter housing and configured to extend out beyond a perimeter of the float and maintain contact with a wall of a water container, and restrict water from passing between the dynamic seal and the wall of the water container throughout motion of the filter housing within the water container from a bottom position near a bottom of the water container to a top position near a top of the water container as the water filter filters water.

2. The water filter system of claim 1, further comprising the float, wherein the float has at least one air chamber within the float.

3. The water filter system of claim 1, wherein the top plate and the bottom plate each have at least one hole extending therethrough.

4. The water filter system of claim 1, wherein the filter coupling is threaded and attaches to the float by coupling with a threaded portion of the float.

5. The water filter system of claim 1, the filter coupling having a lip configured to snap on to the float.

6. The water filter system of claim 1, wherein the float has an opening and the filter coupling covers the opening and restricts water access to the inside of the float when the filter housing is attached to the float.

7. A water filter, comprising:
   a filter housing having:
      a top plate and a bottom plate, wherein the top plate and the bottom plate each are water-permeable; and
      a cavity defined by the top plate and the bottom plate;
   a filter media within the cavity of the filter housing and extending through the bottom plate of the filter housing; and
   a filter coupling extending upward from the top plate of the filter housing and configured to attach to a float.

8. The water filter of claim 7, further comprising a dynamic seal coupled to the filter housing along a perimeter of the filter housing and configured to extend out beyond a perimeter of the float and restrict water from passing between the dynamic seal and a wall of a water container throughout motion of the filter housing within the water container from a bottom position near a bottom of the water container to a top position near a top of the water container as the water filter filters water.

9. The water filter of claim 7, further comprising the float wherein the float has at least one air chamber within the float.

10. The water filter of claim 7, wherein the float has an opening and the filter coupling covers the opening and restricts water access to the inside of the float when the filter housing is attached to the float.

11. The water filter of claim 7, wherein the filter coupling is threaded and attaches to the float by coupling with a threaded portion of the float.

12. The water filter of claim 7, the filter coupling having a lip configured to snap on to the float.

13. A water filter, comprising: a filter housing having a top plate, wherein the top plate is water-permeable; a filter media below the top plate of the filter housing, wherein the filter media extends outside of the filter housing; and a filter coupling extending upward from the top plate of the filter housing and configured to attach to a float.

14. The water filter of claim 13, the filter housing further having a bottom plate and the water filter further comprising a cavity defined by the top plate and the bottom plate, wherein the filter media extends through the bottom plate of the filter housing.

15. The water filter of claim 14, further comprising a dynamic seal coupled to the filter housing along a perimeter of the filter housing and configured to extend out beyond a perimeter of the float and restrict water from passing between the dynamic seal and a wall of a water container throughout motion of the filter housing within the water container from a bottom position near a bottom of the water container to a top position near a top of the water container as the water filter filters water, wherein the float has an opening and the filter coupling covers the opening and restricts water access to the inside of the float when the filter housing is attached to the float.

16. The water filter of claim 14, further comprising a spacer adjacent a bottom of a water container configured to maintain a minimum distance between the bottom of the water container and the bottom plate of the filter housing.

17. The water filter of claim 16, wherein the water container has a spout opening adjacent the bottom of the water container and the filter media extends below a top edge of the spout opening when the bottom plate of the filter housing is at the minimum distance from the bottom of the water container.

18. The water filter of claim 13, further comprising a dynamic seal coupled to the filter housing along a perimeter of the filter housing and configured to extend out beyond a perimeter of the float and restrict water from passing between the dynamic seal and a wall of a water container when the water filter is in a top position near a top of the water container, when the water filter is in an intermediate position near a center of the water container, and when the water filter is in a bottom position near a bottom of the water container.

19. The water filter of claim 13, further comprising the float, wherein the float has at least one air chamber within the float.

20. The water filter of claim 13, wherein the filter coupling is threaded and attaches to the float by coupling with a threaded portion of the float.

\* \* \* \* \*